United States Patent [19]

Yamada et al.

[11] 4,043,661

[45] Aug. 23, 1977

[54] ENLARGER-PRINTER

[75] Inventors: Hiroshi Yamada, Ichikawa; Yukio Shirai, Kawasaki; Minolu Fukuda, Yokohama, all of Japan

[73] Assignee: Ricoh Co., Ltd., Japan

[21] Appl. No.: 679,760

[22] Filed: Apr. 23, 1976

[30] Foreign Application Priority Data

May 1, 1975 Japan ................................ 50-52015

Dec. 8, 1975 Japan ................................ 50-145066

[51] Int. Cl.[2] ...................... G03B 27/48; G03B 27/50; G03B 27/32; G03B 27/52

[52] U.S. Cl. ........................................ 355/50; 355/64

[58] Field of Search .................... 355/8, 45, 50, 51, 64, 355/65

[56] References Cited

U.S. PATENT DOCUMENTS

| | | | |
|---|---|---|---|
| 2,741,960 | 4/1956 | Oldenboom | 355/64 UX |
| 3,094,036 | 6/1963 | Benson | 355/45 X |
| 3,267,797 | 8/1966 | Fowlie et al. | 355/65 |
| 3,597,076 | 8/1971 | Hubbard et al. | 355/65 X |
| 3,802,773 | 4/1974 | Schneider | 355/65 X |
| 3,947,118 | 3/1976 | Amort | 355/64 X |
| 3,988,064 | 10/1976 | Sone et al. | 355/45 X |

*Primary Examiner*—Richard A. Wintercorn

*Attorney, Agent, or Firm*—McGlew and Tuttle

[57] ABSTRACT

An enlarger-printer wherein aperture cards, each mounting a microfilm, are fed one after another from a card hopper, moved in the direction in which the major sides of the cards are oriented and scanned in the direction in which the minor sides of the cards are oriented, so that imagewise exposing of a photosensitive member can be effected for each card to form an enlarged latent image of the film of each card on the photosensitive member, which latent image is then converted into a visible image. Before each card is scanned, the card is moved upwardly a distance corresponding to the margin between the image and the upper edge of the film to reduce the time required for effecting scanning. Switching between lenses of different magnifications, exposing slits of different widths and scanning speeds consistent with desired magnifications of the image can be effected simultaneously by simply actuating a lever. A mark reader may be provided so that these switching operations can be performed automatically prior to effecting exposure by reading a mark on each aperture card. The aperture cards are stacked, after being passed through various steps, in a position which is higher than the optical system of the lenses. The used cards are stacked in the same order and face the same direction as when they were held in the card hopper. Each of the reflectors for reflecting the light emanating from a light source can be withdrawn from the main body of the enlarger-printer lengthwise thereof, and does not require adjustments of its position when inserted in the enlarger-printer again, so that damage to the surface of each reflector, which might otherwise be caused in inserting and with drawing, it can be avoided.

15 Claims, 24 Drawing Figures

ENLARGER-PRINTER

BACKGROUND OF THE INVENTION

This invention relates to an enlarger-printer for enlarging and printing the image of a microfilm mounted on an aperture card.

In a known type of enlarger-printer, the image of a microfilm mounted on an aperture card is enlarged and printed on a copy sheet. This type of enlarger-printer comprises a copying apparatus and an optical system which enlarges the image of a microfilm to a suitable size and forms an enlarged image on the photosensitive member of the copying apparatus. The microfilm mounted on the aperture card is fed lengthwise, or in the direction in which the major sides of the aperture card are oriented, from the card hopper to a scanning device where scanning of the microfilm is carried out in the direction in which the major sides of the aperture card are oriented while the aperture card moves across the light emanating from a light source. The light that has passed through the image of the microfilm is reflected by reflectors of the optical system and forms a latent image on the photosensitive member, which latent image is then developed and printed on a copy sheet by transfer printing, as is the case with a common copying apparatus.

Some disadvantages are associated with this type of enlarger-printer of the prior art. The enlarger-printer generally has dimensions such that its transverse dimension is relatively large and difficulty is experienced in handling the same. Thus, the enlarger-printer of the type described takes more space than is necessary and its drive system and optical system are complex in construction. Since the image of the microfilm mounted on the aperture card has its major sides parallel with the horizontal, it takes a long time to scan the microfilm if scanning is carried out horizontally or in the direction in which the major sides of the aperture card are oriented.

SUMMARY OF THE INVENTION

An object of this invention is to provide an enlarger-printer which eliminates the aforementioned disadvantages of the prior art.

Another object of the invention is to provide an enlarger-printer which eliminates the aforementioned disadvantages of the prior art by carrying out scanning of the microfilm mounted on an aperture card in the direction in which the minor sides of the card are oriented, or vertically, after the card has been fed from the card hopper in a direction in which the major sides of the card are oriented.

In accordance with the present invention, there are provided novel features which enable disadvantages of scanning the microfilm in a direction in which the minor sides of the card are oriented to be eliminated by means of a simple construction.

DESCRIPTION OF THE PREFERRED EMBODIMENTS

Figure 1:
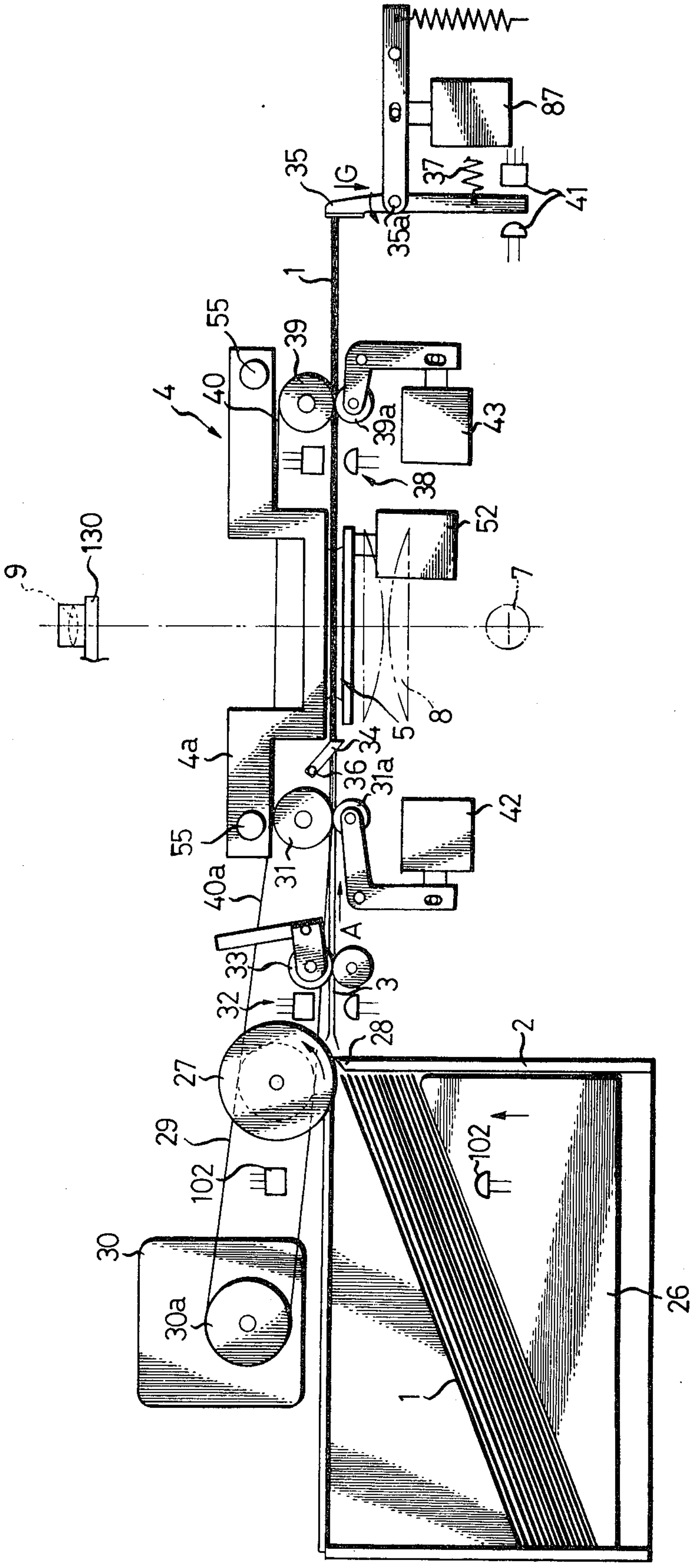
FIG. 1 is a view showing schematically the arrangement of parts of a portion of the enlarger-printer embodying this invention.
Figure 2:
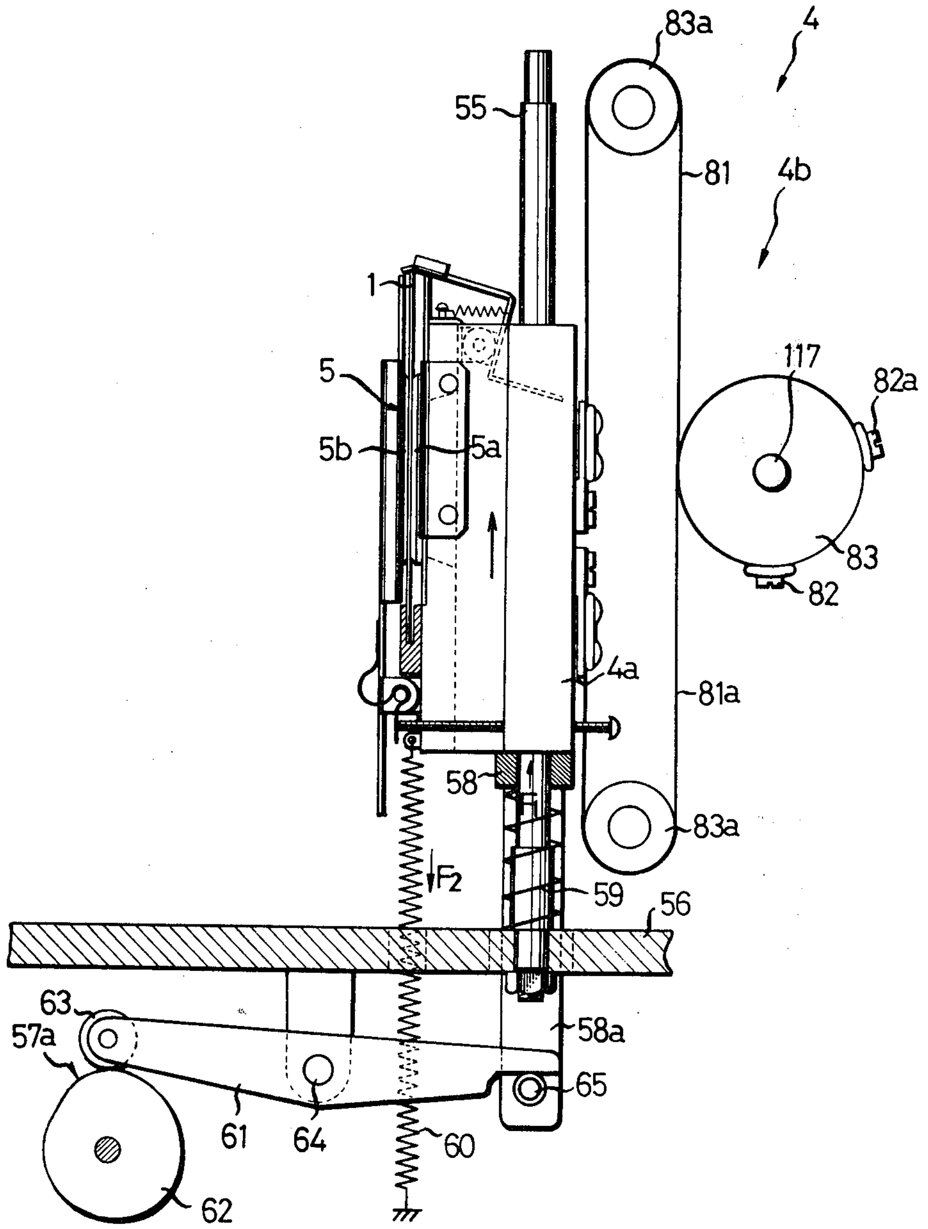
FIG. 2 is a schematic side view, with certain parts being shown in section, of the scanning device and the device for compensating for differences in the margin of a microfilm.
Figure 3:
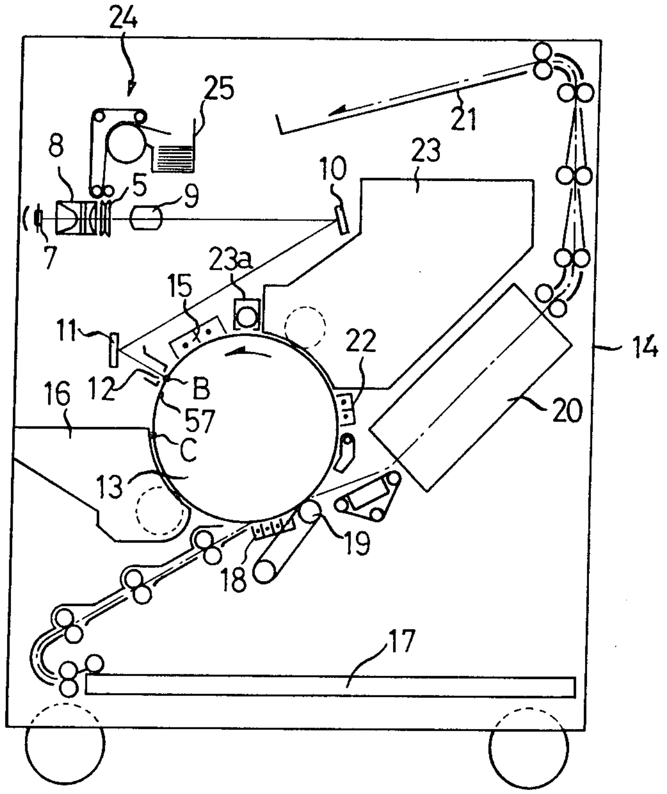
FIG. 3 is a schematic vertical sectional view of the enlarger-printer embodying the invention.

As shown in FIG. 1, aperture cards 1 are supplied one after another from a card hopper 2 and moved along a card path 3 in the direction of an arrow A, with the major sides of each card 1 being oriented in the direction of the arrow A. When the card 1 stops in front of a scanning device 4, it is held by a presser plate means 5 (See FIG. 8). The card 1, which is held by the presser plate means 5, is moved in the direction in which the minor sides of the card are oriented, or upwardly in FIG. 2, by the scanning device 4 for scanning. The scanning device comprises a scanner 4a for carrying the card 1 and a scanner moving means 4b for moving the scanner in a direction in which the minor sides of the card are oriented (See FIG. 2). Referring to FIG. 1 to FIG. 4, an image 6*a* (FIG. 4) of a microfilm 6 mounted on the aperture card 1 is irradiated, through a condenser means 8, by the light emanating from a light source 7 as shown in FIG. 3, when the aperture card 1 is moved upwardly. The light which has irradiated the image 6*a* passes through a projection lens 9, is reflected by first and second reflectors 10 and 11, and is projected onto the peripheral surface of a photosensitive drum 13 through an exposing slit 12. The first and second reflectors 10 and 11 and the photosensitive drum 13 are each arranged parallel to the direction of movement of the aperture card 1.

Referring to FIG. 3, the photosensitive drum 13, which is supported in a casing 14 of the enlarger-printer, is adapted to rotate counter clockwise. As it rotates, the peripheral surface of the photosensitive drum 13 is charged by a charger 15 arranged therealong to cause the same to carry electricity, and a latent image is formed thereon by the light which is incident thereon through the exposing slit 12. The latent image is developed into a visible image by a developing device 16 as the drum 13 rotates. At the same time, a copy sheet is supplied from a sheet supply section 17 and superposed on the peripheral surface of the drum 13 which has been subjected to a developing operation, so that the visible image is transferred to the copy sheet by transfer printing by means of a charger 18 for effecting transfer printing. Thereafter, the copy sheet is stripped off the drum 13 by means of a stripper roller 19 and the image on the copy sheet is fixed by a fixing device 20. The copy sheet is then delivered to a copy sheet stacker 21. After the image on the drum 13 has been transferred to the copy sheet, the drum 13 has its electric charge removed by means of a charger 22, is passed through a cleaning device 23, is irradiated by a quenching lamp 23*a* and is charged again. The aforesaid cycle of operations is repeated. The operation of the drum 13 and the devices associated therewith is identical to that of known electrophotographic copying apparatus.

Figure 5:
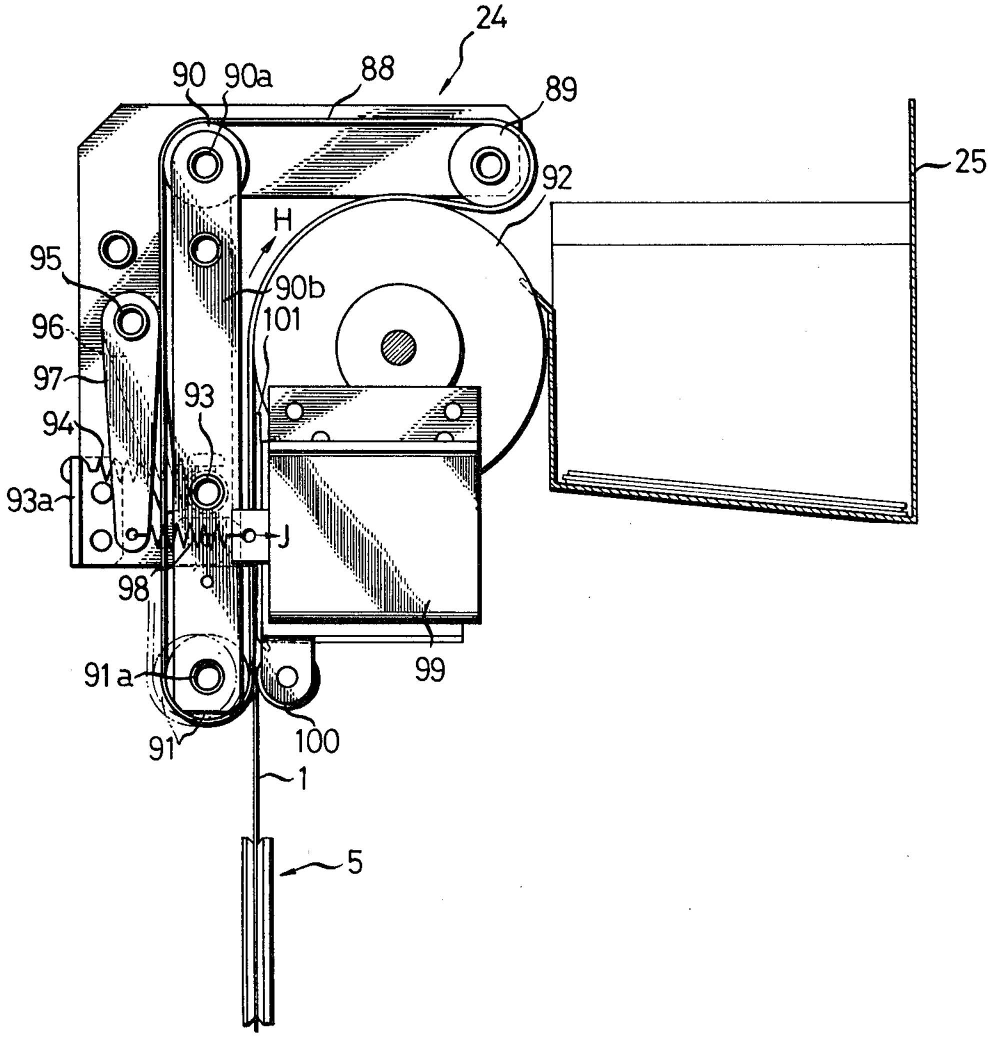
FIG. 5 is a schematic side view, with certain parts being eliminated or shown in section, of the card ejection device.

After being subjected to a scanning operation, the aperture card 1 is further moved upwardly by rollers of a card ejection device 24 shown in FIG. 3 and FIG. 5 and then ejected onto a card stacker 25. As soon as the card ejection device 24 begins to move the card 1 upwardly, the presser plate means 5 and scanner 4*a* move downwardly to their positions shown in FIG. 2, to be ready for holding the next following aperture card for a scanning operation.

The construction and operation of the enlarger-printer in accordance with the invention has been outlined. The enlarger-printer will now be described in detail.

In FIG. 1, a number of aperture cards 1 are stored in the hopper 2 and arranged such that each card stands on one of its major sides. Mounted in the hopper 2 is a pressing plate 26 which urges the aperture cards 1 in the hopper 2 to be biased in the direction of an arrow by being pushed by a spring (not shown). A separation roller 27 is arranged at the outlet of the card hopper 2, while a separation knife 28 is mounted in the card hopper 2 and located such that the knife 28 is positioned substantially against the roller 27. Upon the separation roller 27 being rotated counter clockwise by a drive motor 30 through a roller 30*a* and a belt 29, one aperture card 1 after another is supplied from the card hopper 2 by the separation roller 27 cooperating with the separation knife 28.

The aperture card 1 supplied from the card hopper 2 is moved along the card path 3 in the direction of the arrow A by a first feed roller 31 and a first pinch roller 31*a* cooperating with each other. The aperture card 1 passes between a photocell and a light source making up a first card detection element 32 and a pair of two cards feed detection rollers 33. The two cards feed detection rollers 33 perform the function of detecting if two or more aperture cards are supplied at the same time from the card hopper 2. If two or more cards are supplied from the card hopper 2, the detection rollers 33 shut down the device. The card hopper 2, separation knife 28 and two cards feed detection rollers 33 do not form a part of the present invention, so that no further explanation of them will be necessary.

Figure 7:
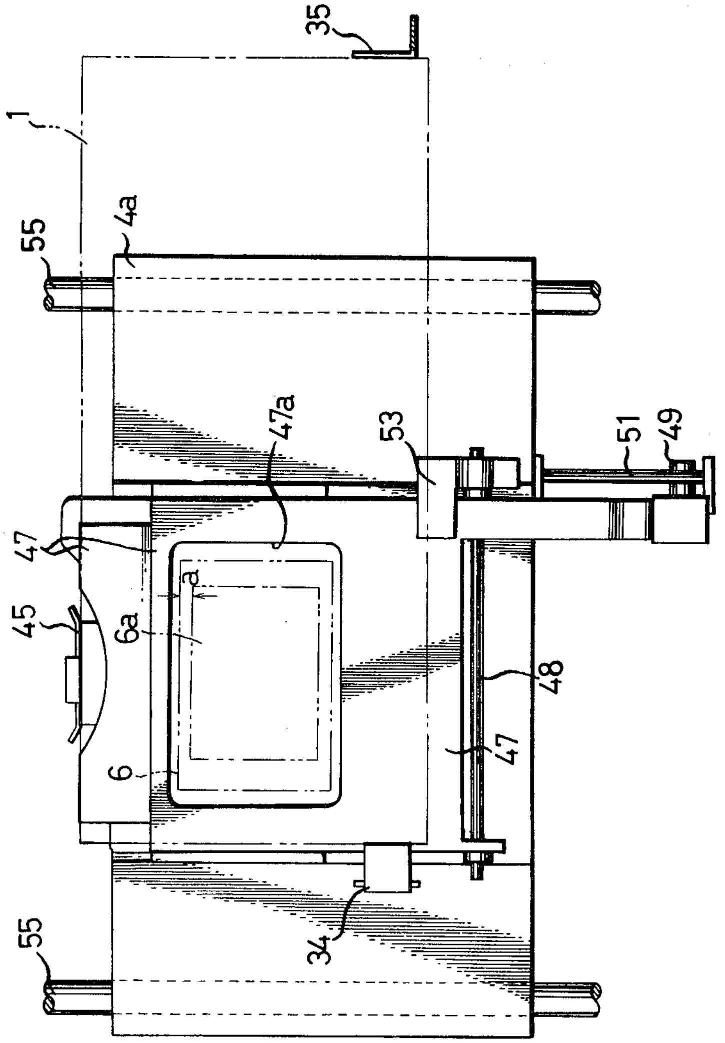
FIG. 7 is a front view of the scanner, the aperture card and a presser plate means.

The aperture card 1 moved by the first feed roller 31 and first pinch roller 31*a* comes to a halt in front of of the scanner 4*a*. In order to cause the aperture card 1 to stop in this position, a card trailing end stopper 34 and a card positioning lever 35 are provided as shown in FIG. 1 and FIG. 7 in accordance with this invention. The card trailing end stopper 34, which is urged to move clockwise about a pivot 36 from the position in which it is disposed in FIG. 1, is normally held in the position shown in FIG. 1, while the card positioning lever 35 is urged to move counter clockwise by the biasing force of a spring 37.

Upon the leading end of the aperture card 1 striking the card trailing end stopper 34 as the aperture card 1 moves to its position in front of the scanner 4*a*, it presses the stopper 34 and moves the same counter clockwise from the position shown in FIG. 1. Thus, the aperture card 1 thrusts aside the card trailing end stopper 34 and moves through a projection aperture section, so that, the aperture card 1 is interposed between a light source and a photocell making up a second card detection element 38 and prevents the light from the light source being incident on the photocell. The aperture card 1 is further moved by a second feed roller 39 and a second pinch roller 39*a* cooperating with each other till it abuts against the card positioning lever 35.

The second feed roller 39 is driven by the drive motor 30 through belts 40 and 40*a*. However, if the light from the light source is prevented from being incident on the photocell of the second card detection element 38, then an electromagnetic clutch of separation roller 27 is disengaged and the separation roller 27 stops rotating. This prevents further supply of the aperture cards 1. Upon the aperture card 1 abutting and pressing against the card positioning lever 35, the lever 35 moves clockwise in pivotal motion about a pivot 35*a*. The pivotal movement of the lever 35 causes a third detection element 41, which is disposed near that end of the lever 35 opposite the end thereof which is brought into abutting engagement with the card 1, to produce a signal which cuts off the supply of power to a first solenoid 42 which maintains the first feed roller 31 and first pinch roller 31*a* in pressing engagement with each other at a predetermined degree of pressure and to a second solenoid 43 which maintains the second feed roller 39 and second pinch roller 39*a* in pressing engagement with each other. The result of this is that the card 1 stops moving from left to right in FIG. 1.

When the card 1 begins to pivot the card positioning lever 35, the trailing end of the card 1 is already disposed inwardly of the card trailing end stopper 34. Accordingly, the card trailing end stopper 34 is already restored to its position shown in FIG. 1. If the card feeding operation is interrupted as aforesaid, then the card positioning lever 35 is pivoted counter clockwise by the biasing force of the spring 37. This moves the card 1 from right to left in FIG. 1 in a direction opposite to the direction in which the card is moved to its position in front of the scanner 4a. However, since the trailing end of the card 1 abuts against the card trailing end positioning stopper 34, the card 1 stops in a predetermined position.

Figure 8:
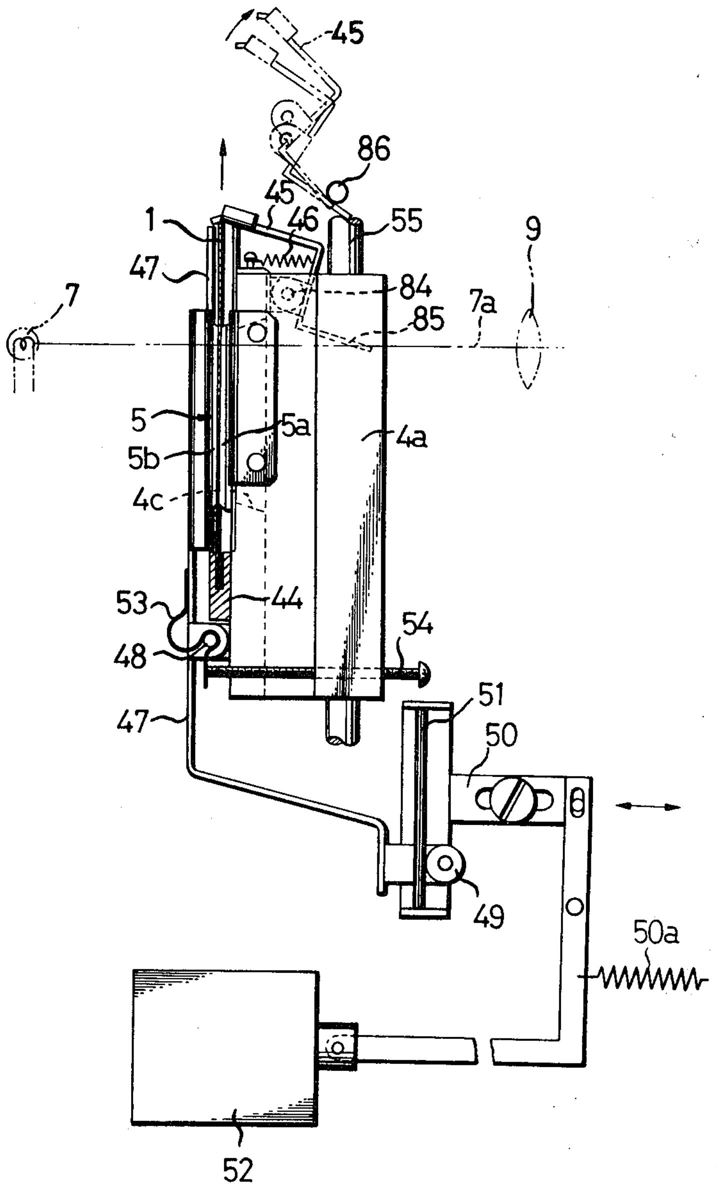
FIG. 8 is a side view, with certain parts being shown in section, of the scanner, presser plate means and the device for opening and closing the presser plate means.

From the time the card is introduced into the predetermined position in front of the scanner 4a till it stops in the predetermined position, the card 1 is guided by a lower card guide 44 formed therein with a groove and an upper card guide 45 shown in FIG. 8 so that its upper and lower positions are regulated by the guides. The lower card guide 44 is affixed to the scanner 4a, while the upper card guide 45 is pivotally connected to the scanner 4a and lightly presses the upper end of the card 1 by the action of a spring 46 as subsequently to be described in detail.

Referring to FIG. 7 and FIG. 8, the presser plate means 5 comprises a fixed plate 5a which is affixed to the scanner 4a, and a pivotal plate 5b which is capable of pivoting relative to the fixed plate 5a. In order to permit the light from the light source 7 to pass therethrough, the fixed plate 5a and pivotal plate 5b are made of transparent glass. The pivotal plate 5b is affixed to a pivotal member 47 which is adapted to pivot about a pivot 48 disposed in the lower portion of the scanner 4a. The pivotal member 47 supports, at its lower end portion, a roller 49 for rotation, which roller is maintained in engagement with a vertical guide 51 affixed to a presser plate opening and closing bracket 50. The bracket 50 is adpated to be moved rightwardly from the position shown in FIG. 8 by means of a solenoid 52 which is shown in both FIG. 1 and FIG. 8. As shown in FIG. 8, the pivotal plate 5b is normally based, by a spring 53 mounted on the pivot 48, to a closed position in which it is in pressing engagement with the fixed plate 5a. The degree at which the pivotal plate 5b is maintained in pressing engagement with the fixed plate 5a can be adjusted by turning an adjusting screw 54, which is threadably connected to the scanner 4a as shown in FIG. 8, to vary the biasing force of the spring 53. As the pivotal member 47 pivots, the pivotal plate 5b pivots through a predetermined angle.

The solenoid 52 (FIG. 1 and FIG. 8) remains energized till the aperture card 1, supplied from the card hopper 2, is stopped in the predetermined position by the action of the card trailing end stopper 34 and the card positioning lever 35. The bracket 50 shown in FIG. 8 is displaced rightwardly from its position shown in FIG. 8, so that the presser plate means 5 is in an open position in which the pivotal plate 5b is out of engagement with the fixed plate 5a. Thus, the card 1 can move into its predetermined position in front of the scanner 4a without any trouble. However, when the third detection element 41 (FIG. 1) produces a signal, the solenoid 52 is deenergized by the signal and permits the pressure plate opening and closing bracket 50 to be moved to its position shown in FIG. 8 by a spring 50a. As a result, the pivotal member 47 is pivotally moved to its closed position by the action of the plate spring 53. In this way, the aperture card 1 is positioned in the aforesaid predetermined position and held between the pivotal plate 5b and the fixed plate 5a of the presser plate means 5.

The scanner 4a is supported, as shown in FIG. 7 and FIG. 8, by two vertically extending fixed guide posts 55, 55 for sliding motion along the axes of the posts 55, 55. As shown in FIG. 2, the posts 55, 55 are secured to a base plate 56. The scanner 4a and the pivotal member 47 are formed with light admitting rectangular openings 4c and 47a, respectively as shown in FIG. 7 and 8. The presser plate means 5 is arranged such that it shields the openings 4a, 47a, and when the aperture card 1 is held in the predetermined position, the microfilm 6 mounted on the card 1 is positioned substantially in the center of the light admitting openings 4c, 47a and the presser plate means 5.

Figure 4:
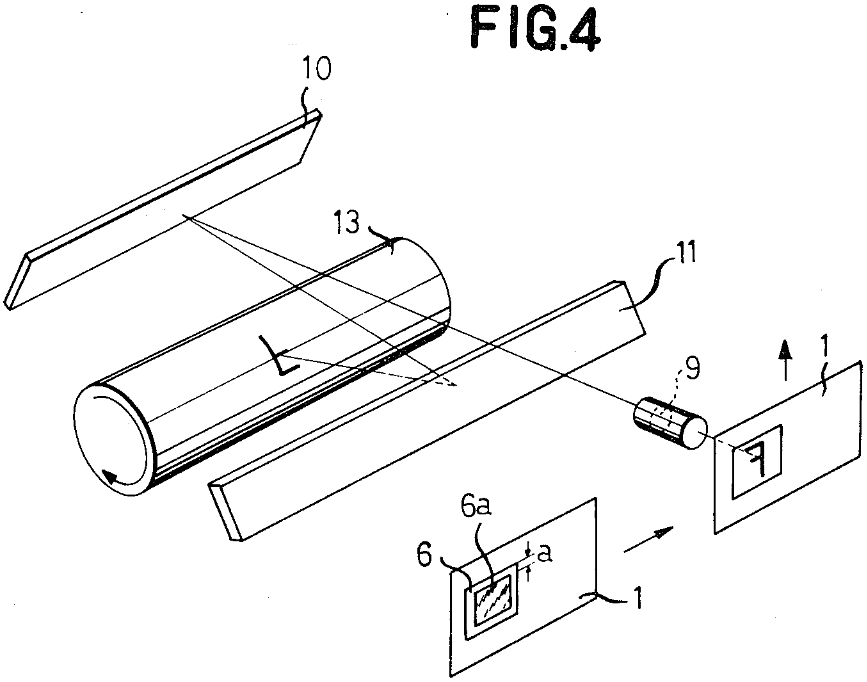
FIG. 4 is a view in explanation of the relation between the optical system and an aperture card in the present invention.

After the card has stopped in the predetermined position and is held by the presser plate means 5, the card must be moved, together with the scanner 4a, in the direction in which the minor sides of the card 1 are oriented, or upwardly in FIG. 7 and FIG. 8, so that the microfilm 6 can be scanned. A microfilm mounted on an aperture card usually consists of an image portion and a non-image portion (margin), and the image portion 6 varies in size from one aperture card to another depending on the size of the original from which the microfilm is produced and the scale of reduction used in producing the microfilm. Therefore, as shown in FIG. 4 and FIG. 7, the size of the margin *a* of the microfilm varies from one microfilm to another depending on the conditions under which the films are produced.

Meanwhile, as shown in FIG. 3, the photosensitive drum 13 has a photosensitive material applied to its peripheral portion, and the layer of the photosensitive material formed on the peripheral surface of the drum 13 generally has a joint 57 on which no latent image can be formed. Accordingly, if a latent image is to be formed on the entire peripheral surface of the drum 13 rotating counter clockwise in FIG. 3, exposing of the photosensitive layer to an optical image of the microfilm should start at a point B which is close to the joint 57. As aforesaid, however, different microfilms have non-image portions of different sizes. Therefore, if scanning is started at the same position for all the microfilms and exposing of the photosensitive drum 13 is started at the point B in FIG. 3 in conjuction with the upward movement of the scanner 4a for a scanning operation, the exposing starting point B may move to, say, a point C while the margin of the microfilm is scanned, with a result that no latent image is formed between the two points B and C. Also, a copy sheet is fed to the peripheral surface of the photosensitive drum 13 in synchronism with the rotation of the drum. If no latent image is formed between the two points B and C on the peripheral surface of the drum 13, no image will be formed in a portion of the copy sheet which is brought into contact with the portion of the drum between the points B and C, thereby causing waste of the copy sheet. In accordance with this invention, a margin differences compensating device is provided for effecting compensation for differences in the margins of the microfilms by lifting the scanner 4a and the card 1 to a proper position when the microfilm to be handled has a margin, prior to scanning of the microfilm. Effecting compensation for differences in the margins of the microfilms also has the effect of shortening the time interval required for effecting scanning.

FIG. 2 shows the margin differences compensating device 57a. Slidably fitted on the vertical guide posts 55, 55 for guiding the scanner 4a is a movable member 58 on which the scanner 4a rests. The movable member 58 is subjected to two forces: one force $F_1$ is exerted by a compression spring 59 mounted between the movable member 58 and the base plate 56 to urge the movable member 58 to move away from the base plate 56 and the other force $F_2$ is exerted by a tension spring 60 mounted between the scanner 4*a* and a fixed part to urge the movable member 58 to move toward the base plate 65. The forces $F_1$ and $F_2$ are set such that $F_1 > F_2$. Thus, the position of the scanner 4*a* may vary depending on the position of the movable member 58.

A lever 61 is provided for positioning the scanner 4*a* by moving the movable member 58 against the biasing force of the compression spring 59. The positioning lever 61 supports at its rear end a roller 63 serving as a cam follower which is maintained in engagement with the cam surface of a cam 62. As the roller 63 moves up and down, the lever 61 pivots about a pivot 64 and pushes downwardly, at its forward end, a roller 65 supported by a depending portion 58*a* of the movable member 58.

Figure 9:
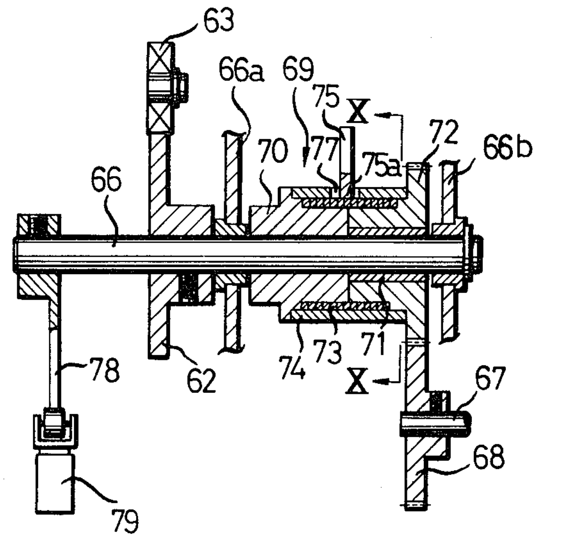
FIG. 9 is a sectional view of the device for compensating for differences in the margin of a microfilm.
Figure 10:
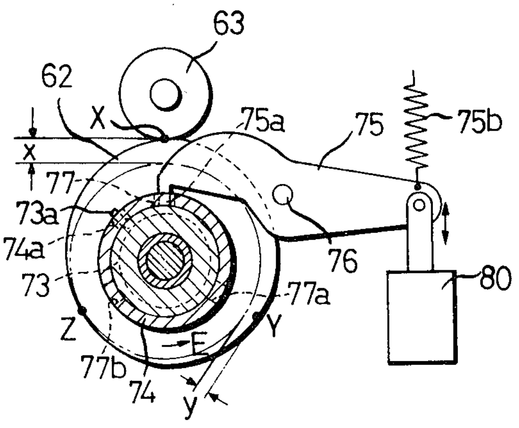
FIG. 10 is a sectional view taken along the line X—X of FIG. 9, with certain parts in FIG. 9 being eliminated.
Figure 11:
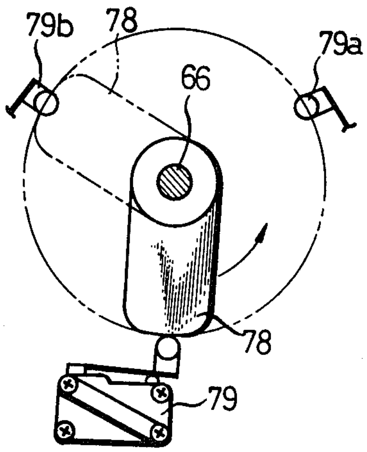
FIG. 11 is a view in explanation of the switch cam in relation to the microswitches.

As shown in FIG. 9 to 11, the cam 62 is secured to a cam shaft 66 which is rotated through a spring clutch 69 by a drive gear 68 secured to a drive shaft 67. The cam shaft is rotatably supported by support plates 66*a*, 66*b* through bearings. The spring clutch 69 comprises a retainer ring 70 secured, as by set screws or the like, to the cam shaft 66, a gear 72 rotatably supported by the cam shaft 66 through an oilless bearing 71, a coil spring 73 and a clutch sleeve 74. Gear 72 is in meshing engagement with the drive gear 68. The coil spring 73 is wound on the boss of retainer ring 70 and the boss of gear 72. If no external force is exerted on the coil spring 73, then the coil spring 73 applies a force of high magnitude to the outer peripheries of the bosses of the retainer ring 70 and gear 72, whereby retainer ring 70 and gear 72 can act as a unit. The coil spring 73 has at one end thereof an upwardly bent portion 73*a* which is engaged in a cutout 74*a* formed in the clutch sleeve 74 mounted on the outer periphery of the spring 73 as shown in FIG. 10.

A release lever 75 (See FIG. 10) pivot can about a pivot 76, and is formed at its forward end with an engaging portion 75*a* in the form of a projection. The clutch sleeve 74 is formed on its outer periphery with recesses 77, 77*a* and 77*b* in which the engaging portion 75*a* of the release lever 75 can be engaged. When the engaging portion 75*a* of the release lever 75 is not engaged in any one of the recesses 77, 77*a* and 77*b*, the rotation of gears 68 and 72 is transmitted to the retainer ring 70, cam shaft 66 and cam 62 through the coil spring 73, because the coil spring 73 is strongly wound on the bosses of the gear 72 and retainer ring 70. However, if the engaging portion 75*a* of the release lever 75 is engaged in any one of the recesses 77, 77*a* and 77*b* formed in the outer periphery of clutch sleeve 74, then the rotation of the clutch sleeve 74 is prevented and at the same time the rotation of the upwardly bent portion 73*a* of coil spring 73 is also prevented. However, since gear 72 rotates in the direction of an arrow E (See FIG. 10), an external force is exerted on the coil spring 73 in such a manner that the force with which the coil spring 73 is wound on the bosses of gear 72 and retainer ring 70 is reduced, so that the coil spring 73 is kept from exerting its influence on gear 72. This allows gear 72 to rotate by itself, while the retainer ring 70 and cam shaft 66 remain stationary.

As shown in FIG. 9 and FIG. 11, a switch cam 78 in the form of an arm is secured to the cam shaft 66. First, second and third microswitches 79, 79*a* and 79*b*, spaced equidistantly from one another, are arranged along the locus drawn by the forward end of the switch cam 78 as the latter rotates about the cam shaft 66. As shown in FIG. 10, the cam 62 has a predetermined height with respect to the base circle of the cam at each of three points X, Y and Z which are equidistantly spaced apart from one another. That is, the height at point X is $x$, the heigt at point Y is $y$ and the height at point Z is zero, with $x>y>o$. These heights correspond to the various sizes of the margins $a$ of microfilms.

The recesses 77, 77*a* and 77*b* are arranged at the same angular positions as the points X, Y and Z on the periphery of cam 62. It is for the purpose of compensating for differences in the margins of three microfilms which have margins of different sizes that the three microswitches 79, 79*a* and 79*b* are arranged in positions corresponding to the three points X, Y and Z on the periphery of cam 62. If it is desired to increase the number of types of microfilms which can have their differences in the size of margins compensated for by the present invention, one has only to increase the number of microswitches. The margin differences compensating device described herein and shown in the drawings is constructed such that, when the margin of a microfilm to be compensated is of the largest size, point Z on the cam 62 is brought into contact with the cam follower 63; when the margin is of an intermediate size, point Y on the cam 62 is brought into contact with the cam follower 63; and when the margin is zero, point X on the cam 62 is brought into contact with the cam follower 63. Thus, the aperture card 1 can be moved upwardly a distance corresponding to the size of the margin of the microfilm mounted thereon. Also, point X on the cam 62 is brought into contact with the cam follower 63 when the switch cam 78 is brought into contact with first microswitch 79; point Y on the cam 62 is brought into contact with the cam follower 63 when switch cam 78 is brought into engagement with second microswitch 79*a;* and point Z on the cam 62 is brought into contact with the cam follower 63 when switch cam 78 is brought into engagement with third microswitch 79*b*. In FIG. 10, the numeral 80 designates a solenoid for actuating the release lever 75, and the numeral 75*b* designates a tension spring.

The margin differences compensating device constructed as aforesaid operates as follows. In initial stages of operation, the switch cam 78 is in engagement with first microswitch 79 as shown in FIG. 11 and hence point X on the cam 62 is in contact with the cam follower 63. Thus, the scanner 4*a* is disposed in the lowermost position. Although the drive shaft 67 is rotating, the retainer ring 70, cam shaft 66 and cam 62 remain stationary, because the engaging portion 75*a* of release lever 75 is engaged in the first recess 77 of clutch sleeve 74.

As aforesaid, the aperture card 1 is supplied from the card hopper 2. Before the card 1 is supplied from the card hopper, the margin size $a$ of the microfilm 6 mounted on the card is ascertained. A changeover switch is actuated such that, when the margin size $a$ is largest, it is set at third microswitch 79*b*, when the margin size $a$ is intermediate, it is set at second microswitch 79*a*, and when the margin size $a$ is zero, it is set at first microswitch 79. To this end, a manually operated switch (not shown) may be depressed. The operation of the device will be explained with reference to the card 1 mounting thereon a microfilm 6 which has a margin of the largest size. In this case, the change-over switch is actuated such that it is set at third microswitch 79*b*. If this is the case, the supply of current to solenoid 80 is not cut off when first microswitch 70 or second microswitch 79*a* is brought into engagement with the switch cam 78, but is cut off when third microswitch 79*b* is brought into engagement with the switch cam 78.

When the aperture card 1 is brought to the predetermined position in the scanning device 4 (See FIG. 1), the solenoid 80 for the release lever 75 shown in FIG. 10 is energized and causes the release lever 75 to pivot clockwise, thereby releasing the engaging portion 75*a* from engagement in first recess 77. The engaging portion 75*a* remains released from engagement in any of the recesses 77, 77*a* and 77*b* till third microswitch 79*b* is actuated by the switch cam 78. Upon the engaging portion 75*a* being released from engagement in first recess 77, the coil spring 73 connects gear 72 to the retainer ring 70, with the result that the cam shaft 66 and hence the switch cam 78 begins to rotate in the direction of an arrow shown in FIG. 11.

Upon the switch cam 78 being brought into engagement with third microswitch 79*b*, the microswitch 79*b* cuts off the supply of current to the solenoid 80 for the release lever 75, thereby de-energizing the same. Accordingly, the engaging portion 75*a* of the release lever 75 is brought into engagement in the recess 77*b*, thereby interrupting the rotation of clutch sleeve 74. This causes the cam shaft 66 to stop rotating, so that switch cam 78 remains in engagement with third microswitch 79*b* as shown in dash-and-dot lines in FIG. 11. During the time the switch cam 78 rotates angularly in the direction of the arrow from the position in which it is in engagement with first microswitch 79 to the position in which it is in engagement with third microswitch 79*b*, the cam 62 rotates in such a manner that a contact between the cam 62 and the roller 63 is made from point X, which has a height *x* to point Z, which has a zero height. Thus, the movable member 58 maintained in contact with the positioning lever 61 (FIG. 2) and hence the scanner 4*a* and the card 1 are moved upwardly a distance corresponding to the size of the margin of the microfilm 6 by the biasing force of spring 59.

When the microfilm 6 mounted on the aperture card 1 has a margin of the intermediate size, the change-over switch is actuated so that it is set at second microswitch 79*a*. The margin differences compensating device operates in the same manner as described hereinabove and the card 1 is moved upwardly a distance corresponding to the size of the margin of the microfilm 6. When the microfilm 6 has no margin, the change-over switch is set at first microswitch 79. If this is the case, the switch cam 78 is in engagement with first microswitch 79 from the beginning, so that the release lever 75 is not actuated and the card 1 does not move upwardly.

In the foregoing description, the change-over switch for selecting one of microswitches 79, 79*a* and 79*b* in the margin differences compensating device has been described as being manually operated. It is to be understood that the invention is not limited to this and that a punched card or mark card indicating the size of the margin of the microfilm mounted thereon may be used as an aperture card. In this case, the information represented by holes or marks is automatically read to actuate the change-over switch to select one of the microswitches 79, 79*a* and 79*b*. The device used for reading the information is known and further description thereof will be unnecessary.

After being moved upwardly a distance corresponding to the size of the margin of the microfilm by the operation of the positioning lever 61 and held in a scanning initiation position, the scanner 4*a* and the aperture card 1 are then moved upwardly for scanning the microfilm 6.

This upward movement is effected by means of the scanner moving means 4*b*. The scanner moving means 4*b* comprises ribbons 81, 81*a*, a ribbon pulley 83, two guide pulleys 83*a* and drive means for rotating the ribbon pulley (See FIG. 2 and FIG. 12). The ribbons 81, 81*a* are made of material such as steel. The ribbons 81, 81*a* are each secured at one end thereof to the back of the scanner 4*a* and at the other end 82 (82*a*) thereof to the peripheral surface of the ribbon pulley 83. The guide pulleys 83*a* guide the ribbons 81, 81*a*, respectively. Rotation of the ribbon pulley in the aniclockwise direction causes the scanner 4*a* and the aperture card 1 held thereby to move upwardly.

The scanning operation of the scanner 4*a* is performed in synchronism with the rotation of the photosensitive drum 13 (FIG. 3) as aforementioned. The ribbon pulley 83 rotates counter clockwise in synchronism with the rotation of the photosensitive drum 13 so as to cause the scanner 4*a* to move upwardly in sliding motion along the guide posts 55, 55. As soon as the scanning operation is initiated, a shutter (not shown) for opening and closing the exposing slit opens. While the scanner 4*a* is moving upwardly, the microfilm 6 mounted on the card 1 moves across an optical axis 7*a* of the light source 7 and is irradiated by the light emanating from the light source 7. The light passes through a lens 9 and forms a latent image on the peripheral surface of the photosensitive drum 13 which rotates in synchronism with the scanner 4*a*.

When the scanning operation of the scanner 4*a* is finished, the aperture card 1 must be withdrawn from the presser plate means 5. To this end, the upper card guide 45 pivotally connected to the scanner 4*a* can pivot about a pivot 84 as shown in FIG. 8. The upper card guide 45 includes a projecting portion 85, at its rear end. The upper card guide 45 is under the influence of the spring 46 as aforementioned and normally maintained in the position shown in FIG. 8. Immediately before the scanning operation reaches its end, the projecting portion 85 of the upper card guide 45 abuts against a fixed pin 86. This causes the upper card guide 45 to pivot about the pivot 84, as shown in dash-and-dot lines, as the scanner 4*a* moves upwardly, so that the upper card guide 45 is released from engagement with the aperture card 1 and no longer holds down the same. When the scanning is completed and the scanner reaches its uppermost position, termination of the scanning operation is detected by a detecting element (not shown) as subsequently to be described and causes the ribbon pulley 83 to stop rotating. At the same time, the solenoid 52 for the pivotal member 47 is energized to move the bracket 50 rightwardly in FIG. 8. This causes the pivotal plate 5*b* to pivot counterclockwise and bring the presser plate means 5 to an open position. Thereafter, the aperture card 1 is ejected by the card ejection device 24 shown in FIG. 5 and FIG. 6.

Simultaneously as the card is positioned in front of the scanner 4*a* and held by the presser plate means 5 for a margin differences compensating operation, a solenoid 87 (See FIG. 1) for the positioning lever 35 is energized to cause the positioning lever 35 to move in the direction of an arrow G. Therefore, scanning of the microfilm 6 on the card 1 can be effected without being obstructed by the positioning lever 35. When scanning of the card 1 is completed and a card ejection operation performed by the card ejection device 24 is initiated, solenoid 87 is de-energized, thereby restoring the positioning lever 35 to its original position where is is ready for the next operation for handling the next following card. As the ejection of the card 1 by the card ejection device 24 is initiated, the solenoid 80 for the release lever 75 is energized to release the release lever 75 from engagement with the clutch sleeve 74. This permits the switch cam 78 to rotate counter clockwise (FIG. 11) to the position in which it is in engagement with first microswitch 79. Upon the switch arm 78 reaching the latter position, solenoid 80 is de-energized and the engaging portion 75*a* of the release lever 75 is brought into engagement in first recess 77, thereby stopping the movement of the switch cam 78. Thus, the cam follower 63 is brought into contact with point X of the cam 62, or returns to its original position, where it is ready for the operation for handling the next following card.

Figure 5A:
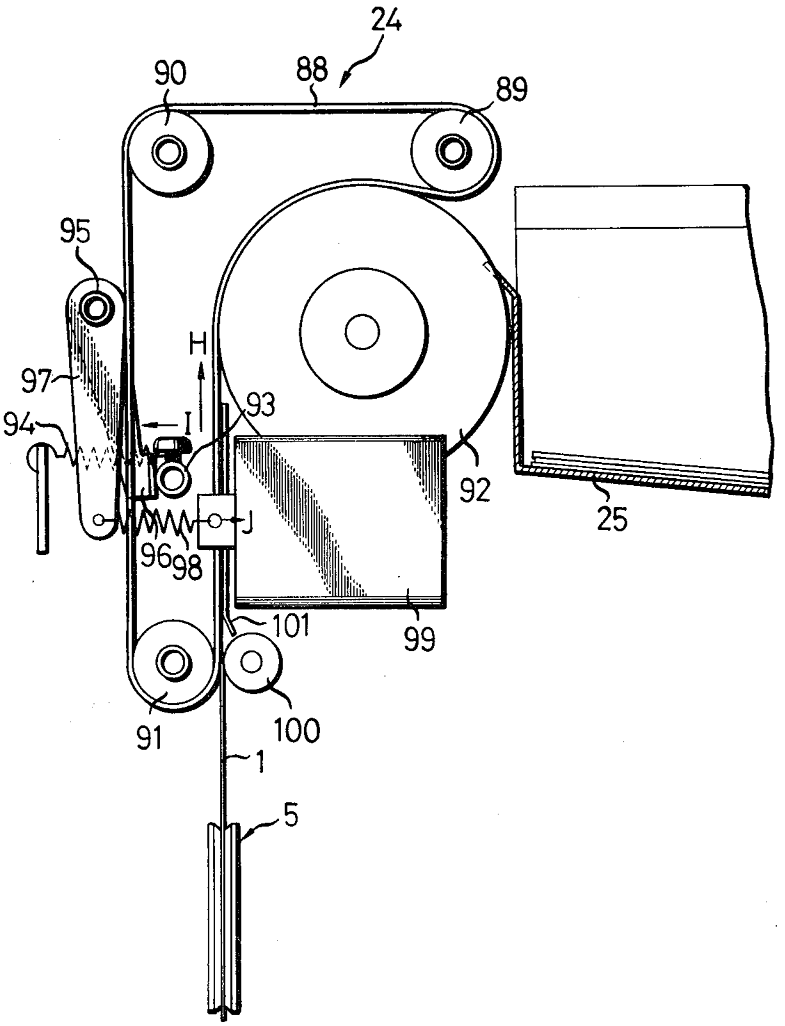
FIG. 5a is a schematic side view, with certain parts in FIG. 5 being eliminated, of the card ejection device.
Figure 6:
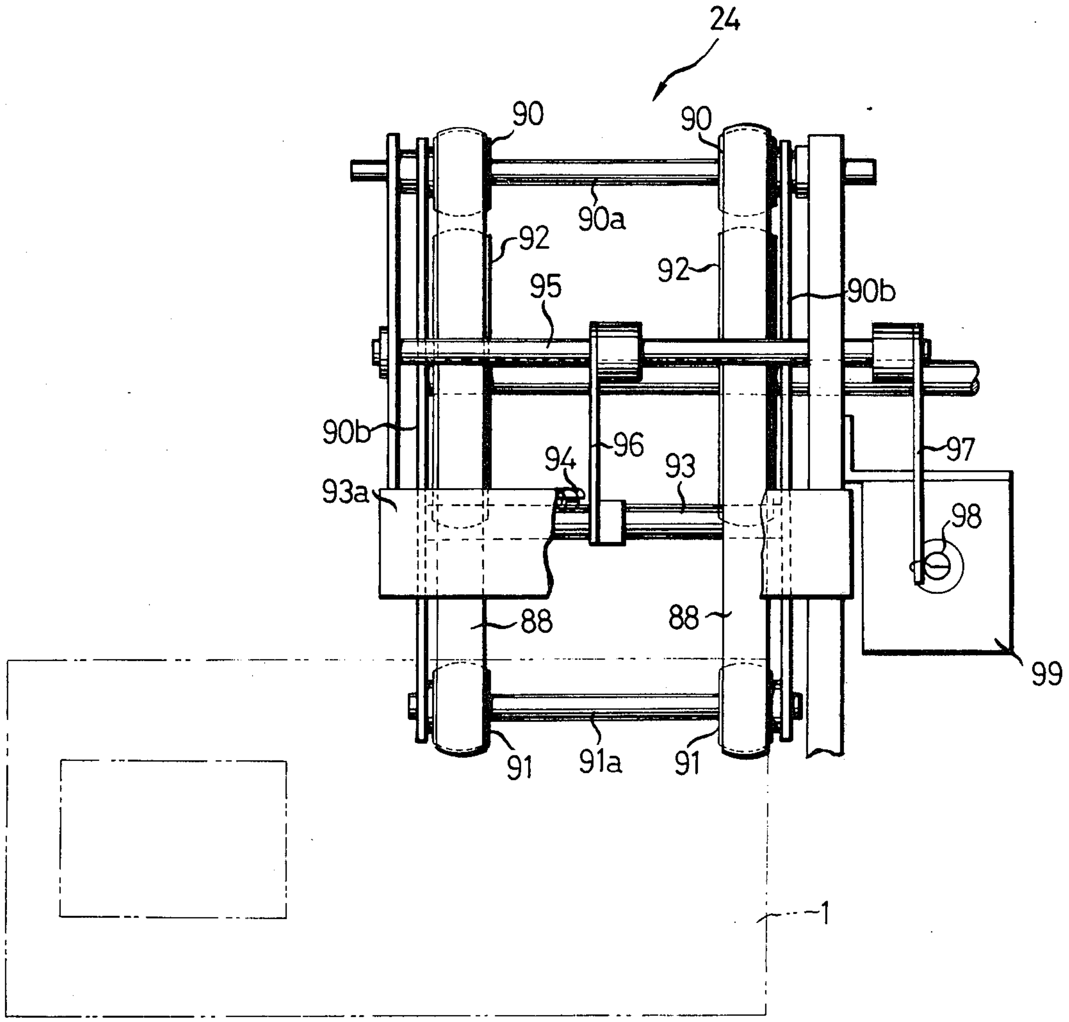
FIG. 6 is a schematic front view in explanation of the relation between the aperture card and the guide rollers shown in FIG. 5, with certain parts being eliminated.

FIG. 5, FIG. 5*a* and FIG. 6 show the card ejection device 24 which comprises ejection belts 88, 88 trained over guide rollers 89, 89, 90, 90 and 91, 91 and moved in the direction of an arrow H by drive rollers 92, 92. The upper guide rollers 90, 90 and the lowermost guide rollers 91, 91 are rotatably supported by a upper shaft 90*a* and a lower shaft 91*a*, respectively. The upper shaft 90*a* is connected with the lower shaft 91*a* through connecting plates 90*b*, 90*b* which are pivotable about the axes of the upper shaft 90*a*. Thus, the lowermost guide rollers 91, 91 are supported for pivotal movement about the axes of the upper guide rollers. A shaft 93, which is fixed to connecting plates 90*b*, 90*b* and can pivot together with the guide rollers 91, 91, is under the influence of a spring 94 mounted between shaft 93 and a fixed part 93*a*. Shaft 93 abuts against a belt pressing arm 96, which is fixed to shaft 95 for pivotal movement about the axis of the shaft 95, to urge the arm 96 to move in the direction of an arrow I. A solenoid arm 97, which is fixedly attached to the belt pressing arm 96 through the shaft 95 to act as a unit with the arm 96 is also pivotable about the axis of the shaft 95. The solenoid arm 97 has a forward end portion which is connected to a solenoid 99 through a spring 98. The pivotal guide rollers 91, 91 and belts 88, 88 are normally urged to move by spring 94 to dash-and-dot line positions shown in FIG. 5. However, energization of solenoid 99 moves the guide rollers 91, 91 and the belts 88, 88 to solid line positions shown in FIG. 5 where the guide rollers 91, 91 are brought into pressing engagement with rollers 100, 100 whose positions are stationary.

While the card 1 is moving upwardly together with the scanner 4*a*, the belts 88, 88 are disposed in dash-and-dot line positions, so that the guide rollers 91, 91 are spaced apart from the rollers 100, 100. However, as the upper end of the card begins to come into contact with the rollers 100, 100 following the completion of the scanning operation and movement of the presser plate means 5 to its open position, the solenoid 99 is energized and pulls the solenoid arm 97 in the direction of an arrow J. This results in the card being held between the guide rollers 91, 91 and the rollers 100, 100 and moved upwardly by the belts 88, 88 and a guide plate 101 and drive rollers 92, 92, until it is delivered finally to the card stacker 25.

The cards 1 stored in the card stacker 25 are arranged such that they are in the same order and face the same direction as they were contained in the card hopper 2. Substantially at the same time as the card 1 is held between the guide rollers 91, 91 and the rollers 100, 100, the scanner 4a moves downwardly. At this time, the presser plate means 5 is in its open position. The presser plate means 5 remains in its open position till the next following card is positioned in front of the scanner 4*a*, even if the scanner moves downwardly into engagement with the movable member 58. However, if a detection element 102 arranged in the card hopper 2 and the first detection elements 32 detect the absence of the next following card, the supply of current to the solenoid 52 for the presser plate means 5 is cut off, thereby bringing the presser plate means 5 to its closed position. Each detection element 102 and 32 consists of a photocell and a light source.

As aforementioned, the card 1 is scanned and then ejected onto the stacker 25. It is not possible to scan all the cards at the same speed, and it is necessary to vary the speed at which scanning is effected depending on the magnification at which the microfilm is enlarged and projected. The movement of the card must be made in synchronism with the rotation of the photosensitive drum. Also, if the scanner which has performed a scanning operation is allowed to move downwardly in an abrupt movement, the force of the impact applied to the associated devices would have adverse effects on the enlarger-printer as a whole. To solve these problems, the present invention provides a drive system for effecting scanning and ejection of the card as shown in FIG. 12.

Figure 12:
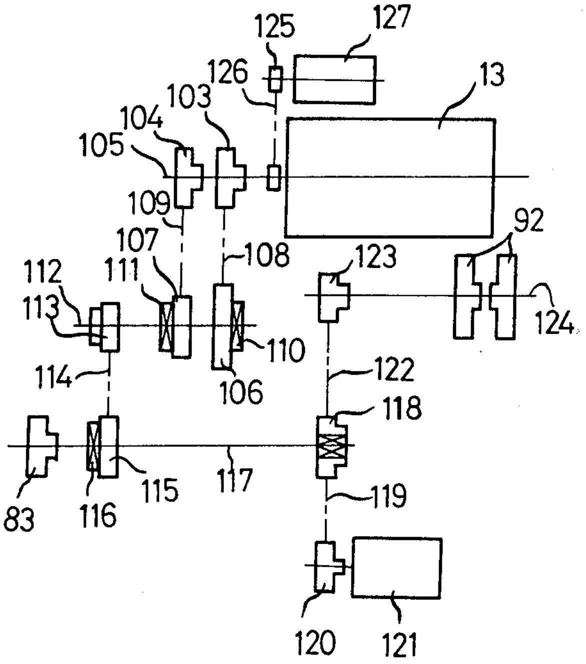
FIG. 12 is a diagram showing the drive system for operating various devices incorporated in the enlarger-printer in accordance with the invention.

Referring to FIG. 12, first and second pulleys 103 and 104 are secured to a shaft 105 of the drum 13, and third and fourth pulleys 106 and 107 are drivingly connected through first and second belts 108 and 109 to first and second pulleys 103 and 104 respectively. Third and fourth pulleys 106 and 107, which have respective electromagnetic clutches 110 and 111 mounted thereon are rotatably supported by a second shaft 112. If the electromagnetic clutch 110 or 111 is engaged, rotation of drum shaft 105 is transmitted to second shaft 112. Secured to shaft 112, which supports third and fourth pulleys 106 and 107, is a fifth pulley 113 which is drivingly connected to a sixth pulley 115 through a third belt 114. Sixth pulley 115 also has mounted thereon an electromagnetic clutch 116.

Sixth pulley 115 is supported by a third shaft 117 which has secured thereto the ribbon pulley 83 (See FIG. 2) described previously which ribbon pulley 83 rotates as third shaft 117 rotates. Also mounted on third shaft 117 is an intermediate pulley 118 which is driven to rotate by a card ejection motor 121 through a drive belt 119 and a drive pulley 120. The intermediate pulley 118 has a built-in one-way clutch which is constructed such that it allows third shaft 117 to rotate in a direction opposite to the direction of rotation of intermediate pulley 118 driven by card ejection motor 121 and does not permit third shaft 117 to rotate at a higher rate than intermediate pulley when third shaft 117 rotates in the same direction as intermediate pulley 118. Intermediate pulley 118 is drivingly connected through a transmission belt 122 to a transmission pulley 123 which is secured to a fourth shaft 124.

Fourth shaft 124 has secured thereto the drive rollers 92, 92 of the card ejection device 24 (See FIG. 5). Drum shaft 105 is driven for rotation by a drive motor 127 through a drive pulley 125 and a drive belt 126. Third pulley 106 and fourth pulley 107 differ from each other in diameter, so that they also differ form each other in reduction ratio. For example, third pulley 106 is used for projecting a microfilm by enlarging the same at a magnification of 15×, while fourth pulley 107 is used for projecting a microfilm by enlarging the same at a magnification of 10×.

Operation of the drive system shown in FIG. 12 will now be described. First of all, when the aperture card 1 is supplied from the card hopper 2, the operator sets the magnification at a desired value. When the microfilm is to be enlarged at a magnification of 15×, the electromagnetic clutch 110 of third pulley 106 is engaged, so as to connect drum shaft 15 to second shaft 112 through first belt 108. Electromagnetic clutch 110 may be actuated, for example, by operating a change-over lever 128 shown in FIG. 13. In initial stages of operation, drum shaft 105 is rotated by drive motor 127, and, since the electromagnetic clutch 110 of third pulley 106 is engaged as aforesaid, second shaft 112 and sixth pulley 115 also rotate. However, since the electromagnetic clutch 116 of sixth pulley 115 is not engaged, third shaft 117 does not rotate.

Meanwhile intermediate pulley 118, transmission pulley 123 and drive rollers 92, 92 are driven for rotation by card ejection motor 121. If the exposing initiation position B (See FIG. 3) of the continuously rotating photosensitive drum 13 is brought to a position in which it is in index with the light emerging from the slit 12, then a detection element (not shown) mounted on the photosensitive drum 13 produces a signal which engages electromagnetic clutch 116, so that third shaft 117 begins to rotate. Rotation of third shaft 117 causes the ribbon pulley 83 secured thereto to rotate. Thus, the scanner **4*a* begins to move upwardly as the ribbons 81 and 81*a* move as described in detail with reference to FIG. 2,** thereby performing a scanning operation.

By this arrangement, the scanner **4*a* begins to move upwardly when the photosensitive drum 13 has completed its preparation or when the photosensitive drum 13 has moved to a position in which the exposing initiation position B is in index with the incident light, so that the drum 13 and scanner 4*a* operates in perfect synchronism with each other and no waste of copy sheet results. At this time, third shaft 117 rotates in a direction opposite to the direction of rotation of intermediate pulley 118, so that third shaft 117** rotates freely by virtue of the one-way clutch.

If the scanner **4*a* completes its scanning operation, the detection element mounted on the photosensitive drum produces a signal which energizes two solenoids 52 and 99 (See FIG. 5 and FIG. 8) and disengages two electromagnetic clutches 110 and 116. However, since fourth shaft 124 and drive roller 92 continue their rotation, the card 1 is ejected by the ejection belts 88, 88 (See FIG. 5) without any trouble as aforementioned. Disengagement of the electromagnetic clutch 116 of sixth pulley 115 causes third shaft 117 and hence ribbon pulley 83 to stop rotating, so that the scanner 4*a* is moved downwardly by its own weight or by the action of spring 60 (See FIG. 2). At the same time, third shaft 117 rotates in the same direction as intermediate pulley 118, but is kept from rotating at a higher rate than intermediate pulley 118 by the action of the one-way clutch. This permits the rate of downward movement of the scanner 4*a* to be controlled, thereby absorbing the shock applied to the movable member 58. Spring 59 performs a shock-absorbing function when the scanner 4*a*** moves downwardly.

Figure 13:
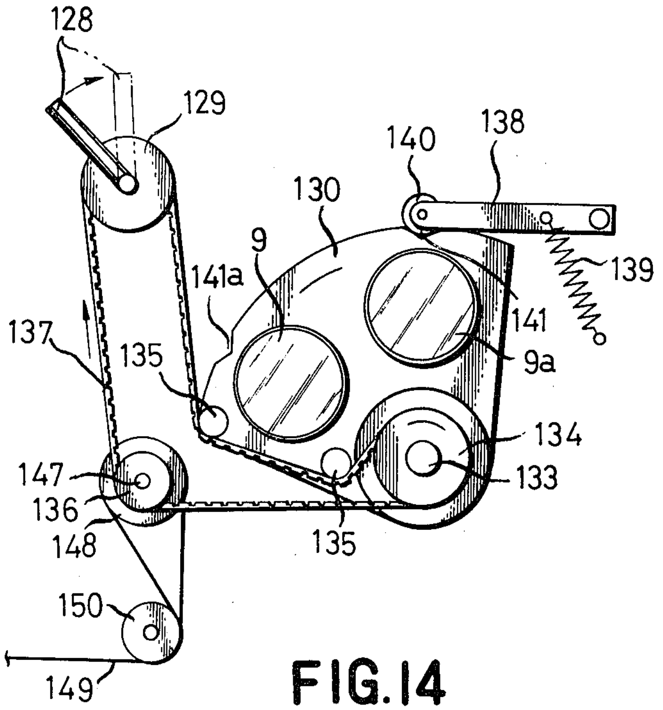
FIG. 13 is a schematic front view of the lens switching device, with certain parts in FIG. 14 being eliminated.

If the microfilm mounted on the aperture card is to be enlarged at a magnification of 10×, the lever 128 shown in FIG. 13 is operated to engage the electromagnetic clutch 111 of fourth pulley 107, so that drum shaft 105 can be connected to second shaft 112 through second pulley 104, second belt 109 and fourth pulley 107.

The foregoing description refers to an operation of producing only one enlarged duplicate of the microfilm and ejecting the card onto the card stacker 25 (See FIG. 5). If it is desired to produce two or more duplicates of the microfilm, the end can be attained by providing a repeating device, which is known, so that the solenoids 52 and 99 are energized after scanning of the microfilm 6 mounted on the card 1 has been repeated the predetermined number of times. If the repeating device is employed, then the card 1 is not ejected from the scanner **4*a* after being scanned once but is moved downwardly together with the scanner 4*a*, followed by a further upward movement for a further scanning operation. After the microfilm is scanned the predetermined number of times, the card 1 is ejected from the scanner 4*a*.**

The aforementioned problems are solved by providing the abovementioned drive system of simple construction in accordance with this invention. Another problem that must be solved is that, when the magnification at which a microfilm is enlarged when it is projected is varied, it is necessary to use a lens which suits the required magnification, in addition to varying the rate of upward movement of the scanner **4*a*. Also, the use of lenses of different magnifications results in a change in the intensity of illumination to which the photosensitive drum is exposed if the same light source is used. Therefore, the use of another lens makes it necessary to alter the width of the opening of the slit 12 described with reference to FIG. 3. More specifically, the intensity of illumination to which the photosensitive drum is exposed when the microfilm is enlarged at a magnification of 15× will be lower than when the microfilm is enlarged at a magnification of 10×. This makes it mandatory to increase the width of the opening of the slit 12** when the magnification is increased from 10× to 15×. In accordance with the invention, means is provided for effecting switching between the lenses and effecting changes in the width of the slit opening in one operation, so that the construction of the enlarger-printer can be simplified and its operation can be facilitated.

Figure 14:
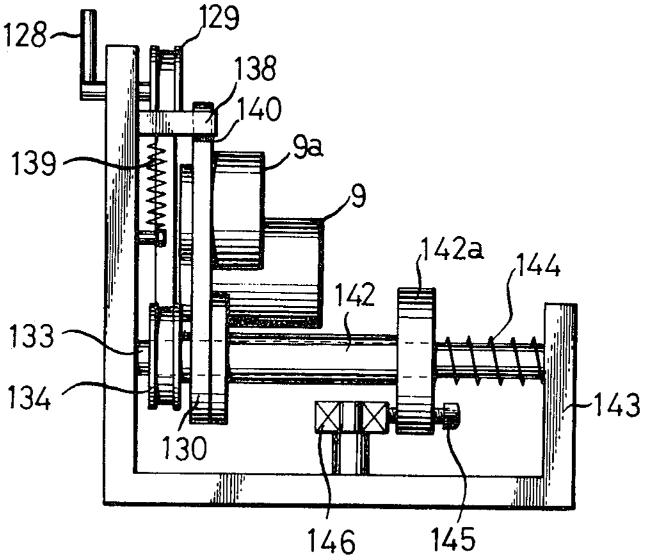
FIG. 14 is a side view of the lens switching device.

Referring to FIG. 13 and FIG. 14, the lever 128 functions such that, as aforementioned, it can cause either one of the two electromagnetic clutches 110 and 111 shown in FIG. 12 to be engaged depending on the magnification at which the microfilm is to be enlarged when it is projected. In accordance with the invention, lever 128 can also perform the function of switching between different lenses. The lever 128 has secured thereto a lever pulley 129 so that the two members act as a unit. A segmental turret 130 mounts thereon two lenses 9 and **9*a* (See FIG. 13), one lens 9 being used for enlarging the microfilm at a magnification of 10× while the other lens 9*a* being used for enlarging the same at a magnification of 15× when the image of the microfilm is projected. The turret 130 is secured to a sleeve 142 which has secured thereto a turret pulley 134. A timing belt 137 is trained over lever pulley 129 and turret pulley 134 through guide roller 135 and a guide pulley 136.**

When the turret 130 is in a position shown in FIG. 13, the light from the light source passes through the lens **9*a* of magnification 15×. If it is desired to enlarge the microfilm at a magnification of 10× when it is copied, then lever 128 is moved clockwise to a dash-and-dot line position in FIG. 13. Movement of lever 128 causes the timing belt 137 to move in the direction of an arrow, so that turret 130 pivot clockwise and permits the light from the light source to pass through the lens 9 of magnification 10×. A hold-down lever 138 is normally urged by the biasing force of a spring 139 to pivot counter clockwise and has mounted at its forward end a roller 140 which is adapted to be engaged in one of cutouts 141 and 141***a* formed on the periphery of the turret 130 when one of the lenses 9 and 9*a* has moved to a predetermined position, thereby positioning the turret 130 in a predetermined position in which the optical axis of one of the lenses 9 and 9*a* is brought into alignment with the microfilm.

The sleeve 142 is rotatably and slidably supported by a shaft 133 and urged to move forwardly by the biasing force of a coil spring 144 mounted between a frame 143 and a flange 142*a* provided at the rear end of the sleeve 142. The flange 142*a* has threaded therethrough focusing screws 145, 145. One of the focusing screws 145, 145 is adapted to come into contact with the outer periphery of a bearing 146 when one lens 9 is used, while the other focusing screw is adapted to come into contact with the outer periphery of the bearing 146 when the other lens 9*a* is used. The two focusing screws 145, 145 are set such that the respective lenses 9 and 9*a* can be focused on the microfilm mounted on the aperture card. Thus, if lens 9 or 9*a* is brought to a predetermined position, the lens is automatically focused on the microfilm, thereby eliminating the need to effect focusing each time one lens is replaced by the other lens.

Figure 15:
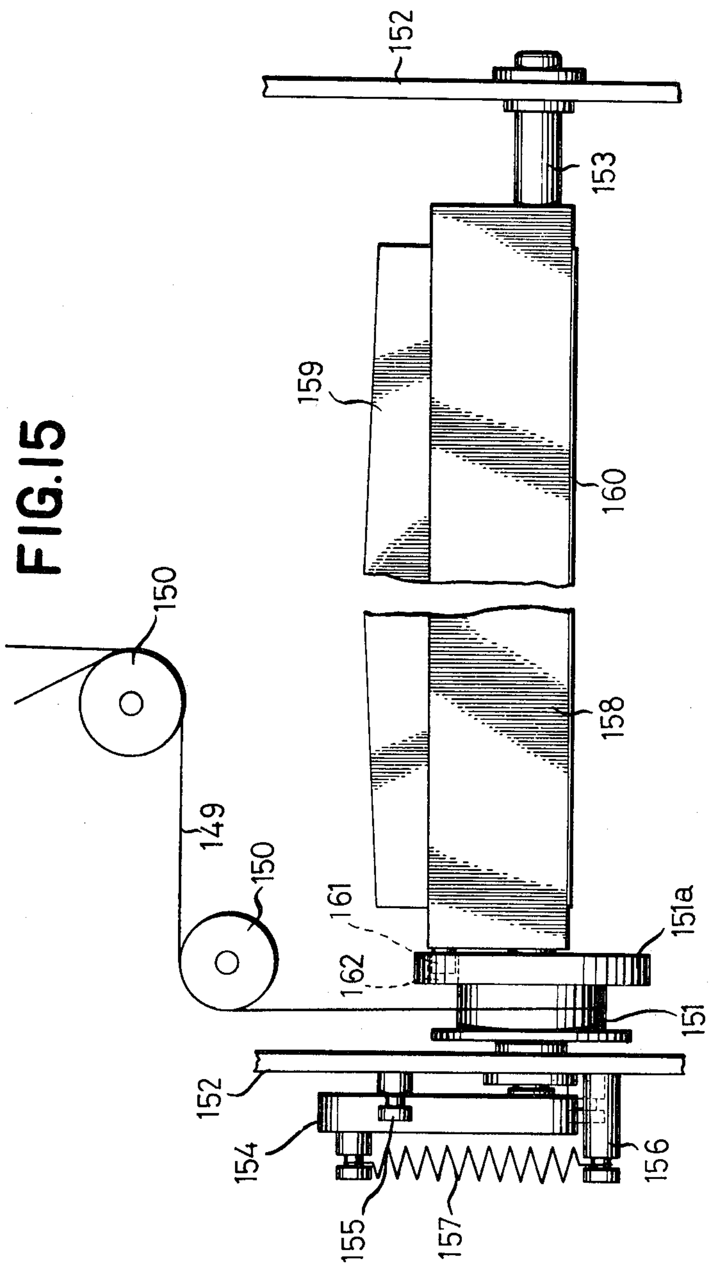
FIG. 15 is a front view of the slit plates and the mechanism for operating the slit plates.
Figure 16:
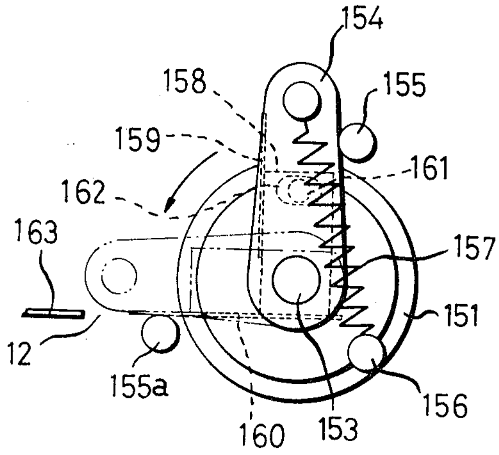
FIG. 16 is a side view of FIG. 15, with the frame being eliminated.

The guide pulley 136 is supported by a shaft 147 and has secured thereto a change-over pulley 148. A wire 149 is connected at one end to the change-over pulley 148 and guided by a guide roller 150 before being trained over a pulley 151 for the slit as shown in FIG. 15. The pulley 151 for the slit is rotatably supported by a shaft 153 connected to a frame 152 and having secured to its end portion a lever 154 for the slit. As shown in FIG. 16, the pivotal movement of the lever 154 for the slit is restricted by two stoppers 155 and 155*a,* with the lever 154 being able to move through about 90°. Mounted between the forward end of the lever 154 for the slit and a spring anchor 156 is a spring 157 which performs what is referred to as a toggle action. When the lever 154 for the slit is in engagement with the stopper 155 or 155*a,* the lever 154 remains stationary.

Secured to shaft 153 is an elongated plate 158 to which two plates 159 and 160 are secured. The two slit plates 159 and 160, which differ from each other in width, are arranged such that they are disposed at right angles to each other. Attached to one end surface of the elongated plate 158 is a pin 161 which is received in a slot 162 formed in the flange 151*a* of the pulley 151 for the slit. The reference numeral 163 designates a light intercepting plate which cooperates with one of the slit plates 159 and 160 to provide the exposing slit 12 (See FIG. 3). As shown in solid lines in FIG. 16, the smaller-width slit plate 160 and the light intercepting plate 163 form therebetween the exposing slit 12 of a larger width for enlarging the microfilm at a magnification of 15×.

As aforesaid, pivoting of lever 128 clockwise in FIG. 13 results in the change-over pulley 148 rotating in the same direction, so that the wire 149 is pulled and causes the pulley 151 for the slit to rotate. Rotation of the pulley 151 for the slit is transmitted through pin 161 to the elongated plate 158. This causes the shaft 153, lever 154 and slit plates 159 and 160 to move counter clockwise as shown by an arrow in FIG. 16, and the slit plate 159 stops in a dash-and-dot line position because the spring 157 performs a toggle action. In this case, it may be difficult to accurately position the pulley 151 for the slit because of the lack of precision in the length of the wire 149. According to the invention, this problem is solved by the feature that, since pin 161 is received in the slot 162, the position of lever 154 is corrected, with the result that lever 154 can be positioned by the action of spring 157 and stopper 155*a* without being subjected to an overload. Upon the slit plate 159 moving to a dash-and-dot line position shown in FIG. 16, the larger-width slit plate 159 cooperates with the light intercepting plate 163 to form therebetween an exposing slit 12 of a smaller width for enlargement of the microfilm at a magnification of 10×.

When it is desired to produce a reproduction of the microfilm enlarged at a magnification of 15× again, lever 128 is pivoted counter clockwise to a solid line position shown in FIG. 13. This causes the lens and the exposing slit for a magnification of 10× to be changed simultaneously to the lens and the exposing slit for a magnification of 15×.

The intensity of illumination to which the photosensitive drum 13 is exposed will be lowered in going from the center toward the ends thereof. To eliminate this disadvantage, the slit plates 159 and 160 according to the invention are shaped such that they are smaller in width in the ends and larger in width in the center as shown in FIG. 15. By this arrangement, it is possible to expose the entire surface of the photosensitive drum 13 to a uniform volume of light.

In accordance with the invention, pivotal movement of lever 128 simultaneously enables one lens to be replaced by another lens, one slit width to be changed to another slit width, and the scanning speed to be varied (by causing either one of the electromagnetic clutches 106 and 107 shown in FIG. 12 to be engaged). The enlarger-printer in accordance with the invention is convenient to use because all the aforementioned operations can be performed by moving the lever 128 to a predetermined position.

As aforesaid, the lens, exposing slit width and scanning speed are selected beforehand in accordance with the magnification at which the microfilm is to be enlarged for copying purposes. Then, the card 1 is moved in a scanning operation by moving the same across the path of light from the light source 7. The light passing through the microfilm 6 is reflected by the two reflectors 10 and 11 and forms a latent image on the photosensitive drum 13 as described with reference to FIG. 3 and FIG. 4. Prolonged use of the reflectors 10 and 11 often results in dust being gathered on their surfaces and having adverse effects on a latent image formed on the photosensitive drum. This makes it necessary to remove the reflectors from the optical system and clean the same from time to time.

Reflectors of the prior art are mounted such that each of them is supported at three points by three screws after being inserted in the casing through its opening. Thus, when the reflector is withdrawn from the casing through its opening for cleaning purposes, there is the danger of scratching and damaging of the surface of the reflector by the screws. This damage to the reflector can be avoided by loosening the screws and moving the screws away from the reflector before withdrawing the reflector. However, this entails the need to readjust the screws when the reflector is mounted in the casing again. This is because it is impossible to cause a well-defined latent image to be formed on the photosensitive drum unless the reflectors are accurately positioned. In accordance with the present invention, the aforementioned disadvantages of the prior art can be eliminated by a simple device.

Figure 17:
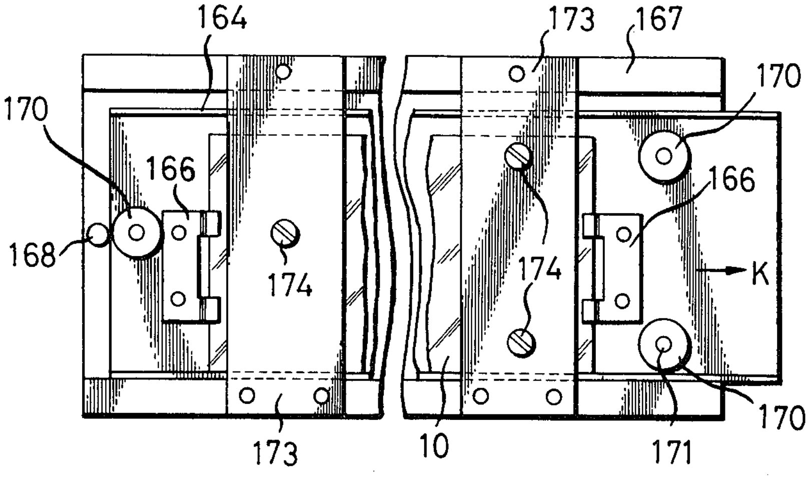
FIG. 17 is a front view, with certain parts being cut away, of the reflector mounting device.
Figure 18:
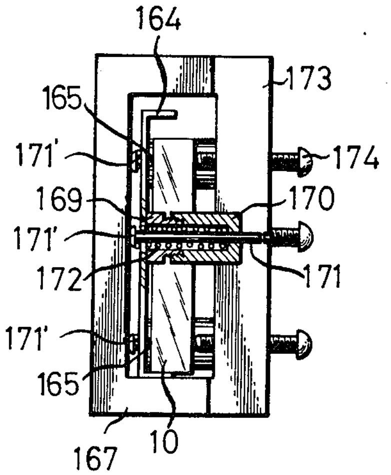
FIG. 18 is a side view, with certain parts being shown in section, of FIG. 17.

In FIG. 17 and FIG. 18, the reflector 10 is shown as being supported at three points by three pins 165 attached to a mounting plate 164, and held in place by holding members 166, 166 which are connected to the mounting plate 164 and arranged to engage opposite ends of the reflector 10. The mounting plate 164 is guided by a guide plate 167 and positioned against a stopper 168 affixed to the guide plate 167. The mounting plate 164 is formed with three openings in each of which a tubular or cylindrical member 169 is secured. A cap-shaped knob 170 may be detachably threaded onto each member 169, and a shaft 171 extends through of the knobs 170. Springs 172 are each mounted on the shafts 171 and enclosed by the knobs 170 and the member 169. Each spring seats at one end thereof on a seat 171' formed at one end of the associated shaft 171. If the cap 170 is threaded onto the member 169, the spring 172 will be compressed and bias the mounting plate 164 away from the guide plate 167.

The guide plate 167 has secured thereto two bridge members 173 which extend over the reflector 10. One of the bridge members 173 has an adjusting screw 174 threaded therethrough and the other has two adjusting screws 174 threaded therethrough. By turning the adjusting screws 174, it is possible to move the reflector 10 against the biasing force of the springs 172. Thus, it is possible to effect adjustments of the reflectors 10 by operating the adjusting screws 174. The adjusting screws 174 each have a spherical forward end so that damage to the surface of the reflector treated by vaporization deposition of a metal in vacua can be avoided when the adjusting screws 194 are brought into contact with the reflector 10. The guide plate 167 is supported in an opening formed in the casing 14 (See FIG. 3).

When it is desired to perform cleaning of the reflector surface, each knob 170 is detached from the associated cylindrical member 169 and removed together with the spring 172 and shaft 171. This places the reflector 10 in a position in which it is not under the influences of the springs 172. While in this state, the reflector 10 can be freely moved in spite of the presence of the adjusting screws 174. Thus, the reflector 10 can be readily withdrawn in the direction of an arrow K. After completion of cleaning, the reflector 10 is inserted together with the mounting plate 164 into the position shown in FIG. 17, and the shafts 171 and springs 172 are inserted in the associated cylindrical member 169 before the knobs 170 are threaded onto the associated cylindrical members 169. This places the reflector 10 in the predetermined position without requiring to operate the adjusting screws 174.

From the foregoing description, it will be appreciated that the invention provides means whereby the reflector 10 can be withdrawn and inserted without being damaged by the adjusting screws 174, and the adjusting screws 174 do not need readjustments. Even if the forward ends of the adjusting screws 174 are brought into contact with the surface of the reflector and slightly damage the same when the adjusting screws 174 are adjusted, this does not raise any problem because the portions of the reflector surface which are brought into contact with the adjusting screws 174 are not required to perform the function of the reflector.

Figure 19:
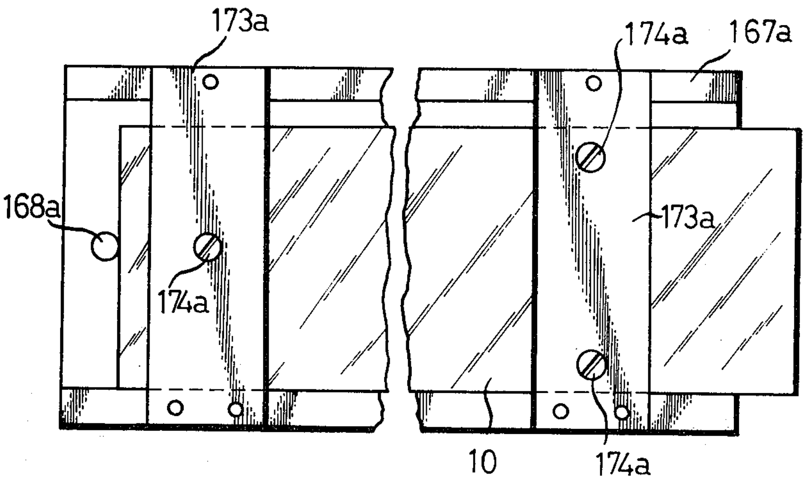
FIG. 19 is a front view, with certain parts being cut away, of a modification of the reflector mounting device.
Figure 20:
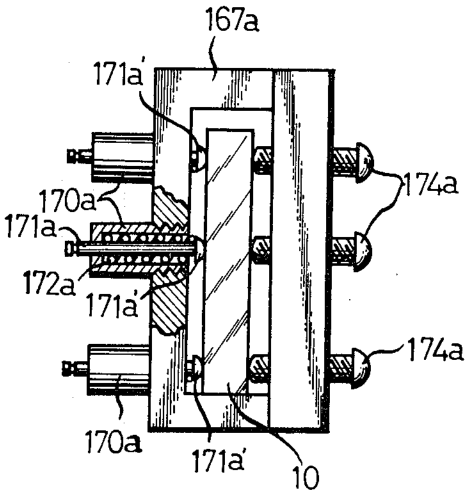
FIG. 20 is a side view, with certain parts being shown in section, of FIG. 19.

FIG. 19 and FIG. 20 show an alternative device for mounting a reflector. As shown, the reflector 10 is directly guided by a guide plate 167*a* and abuts at one end thereof against a pin 168*a*. Three knobs 170*a* are removably threaded into holes formed at the back of the guide plate 167*a*, each knob 170*a* having mounted therein a spring 172*a* which is guided by a shaft 171*a* and is in a compressed state with seating on a seat 171*a'* formed to the shaft 171*a*. The springs 172*a* press the shafts 171*a* against the reflector 10 so as to bring the latter into pressing engagement with the forward ends of adjusting screws 174*a*. The guide plate 167*a* has secured thereto two bridge members 173*a* into which three adjusting screws 174*a* are threaded. The adjusting screws 174*a* abut at their forward ends against the reflector 10 so as to compress the springs 172*a*. The reflector 10 of this device can be positioned by operating the adjusting screws 174*a* in the same manner as described with reference to the corresponding device shown in FIG. 17 and FIG. 18. Each adjusting screw 174*a* is in alignment with the associated spring 172*a* although they are disposed on opposite sides of the reflector 10. When it is desired to remove the reflector 10, the knobs 170*a* are removed to place the reflector in a position in which it can be moved freely. Then, the reflector 10 can be withdrawn with ease. In this alternative device too, the surface of the reflector is not damaged by the adjusting screws 174*a* and readjustments of the adjusting screws 174*a* are not required. It is to be understood that the second reflector 11 also can be constructed identically with the construction shown in FIG. 17, 18 or FIG. 19, 20.

Figure 21:
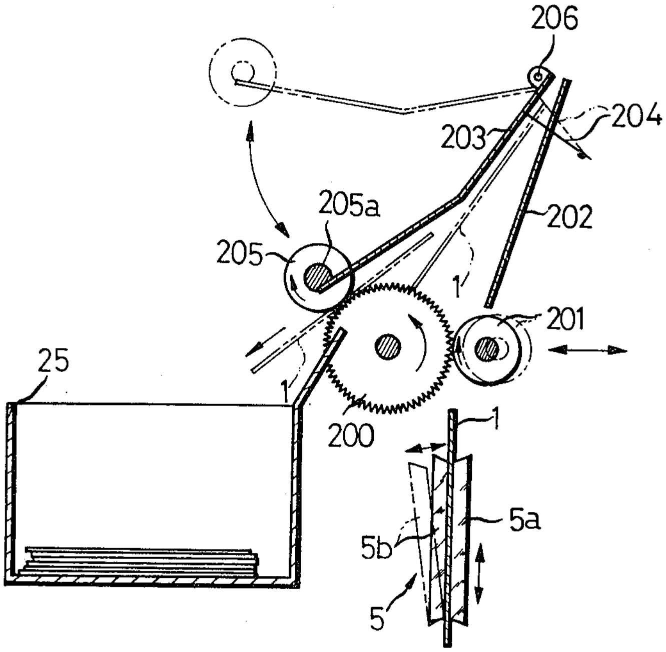
FIG. 21 is a schematic sectional view of an alternative device for ejecting the card.
Figure 22:
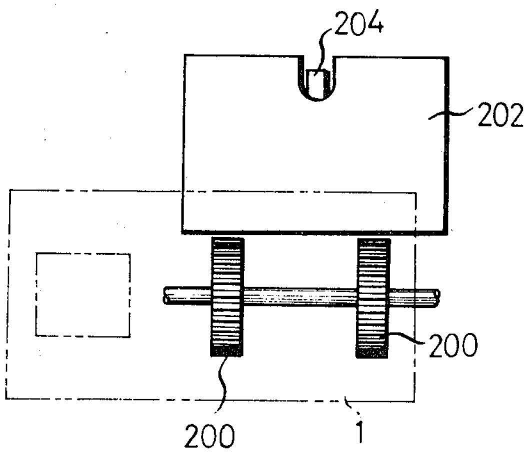
FIG. 22 is a front view in explanation of the arrangement of the drive rollers and the fixed guide plate in relation to the card.

FIG. 21 and FIG. 22 show an alternative device for ejecting the card which differs from the card ejection device 24 shown in FIG. 5, FIG. 5*a* and FIG. 6. The parts shown in FIG. 21 and FIG. 22 which are identical to those shown in FIG. 5, FIG. 5*a* and FIG. 6 are designated by like reference characters.

In FIG. 21, the aperture card 1 is supplied from the card hopper and stands on one of its major sides. It is moved in a direction in which the major sides of the card are oriented or a direction perpendicular to the plane of FIG. 21. The aperture card 1 stops in front of the scanner and is held between the fixed plate 5*a* and the pivotal plate 5*b* of the presser plate means 5. The presser plate means 5 which holds the aperture card 1 moves upwardly, so that the microfilm mounted on the card 1 is scanned. The construction and operation of the devices described above are identical to those described previously.

In FIG. 21 and FIG. 22, a drive roller 200 adapted to rotate counter clockwise and a feed roller 201 adapted to be brought into and out of engagement with drive roller 200 are arranged above the presser plate means 5. The movement of the feed roller 201 may be effected by means of a solenoid as is the case with the guide rollers 91, 91 of the previously described device. The drive roller 200, which is made of a material such as a elastic material, is formed on its periphery with a serration. A guide plate 202 secured to the machine frame is arranged above the feed roller 201, while a pivotal guide plate 203 is maintained in spaced juxtaposed relation with the fixed guide plate 202. A card returning member 204 is arranged above the two guide plates 202 and 203. In this device, a plate spring which is fixed at one end is used as the card returning member which can readily bend to a dash-and-dot line position shown in FIG. 21.

The feed roller 201 is normally spaced apart from the drive roller 200 as shown in a dash-and-dot line circle. Upon completion of scanning of the microfilm mounted on the card 1, a scanning completion signal is produced to cause the drive roller 200 to rotate counter clockwise. At the same time, the feed roller 201 is moved leftwardly by the plunger of a solenoid into pressing engagement with the drive roller 200. At this time, the upper end of the aperture card 1 is held between the drive and feed rollers 200 and 201 and the pivotal plate member **5*b* moves to an open position to permit the card 1 to be moved upwardly by the two rollers 200 and 201.**

The card 1 which is moved upwardly by the two rollers 200 and 201 moves upwardly while contacting the fixed guide plate 202 and the pivotal guide plate 203. The pivotal guide plate 203 is slightly inclined rightwardly in FIG. 21 or toward the rear portion of the enlarger-printer with respect to the direction in which the minor sides of the card 1 held by the presser plate means 5 are aligned or in the vertical direction. Accordingly, as the upwardly moving card is brought into contact with the pivotal guide plate 203, the card 1 is also slightly inclined in moving upwardly. When the forward end of the card 1 strikes the card returning member 204 and presses the same, the member 204, which comprises a plate spring, bends to the dash-and-dot line position, and at the same time the lower end of the card 1 is released from engagement with the drive roller 200 and the feed roller 201. At this time, the card 1 is slightly inclined rightwardly and urged by the biasing force of the returning member 204 against the serrated periphery of the drive roller 200, so that the card 1 gradually changes its direction as the roller 200 rotates counter clockwise. The serration on the periphery of the roller 200 keeps the card 1 from slipping, so that the card 1 is forced by the drive roller 200 and the card returning member 204 to change its direction.

After having its direction changed, the card 1 is held between the drive roller 200 and a returning roller 205 maintained in engagement with the drive roller 200. The card 1 is thus moved by the two rollers 200 and 205 and stacked in the card stacker 25 disposed on the front side of the enlarger-printer. The cards stacked in the card stacker are in the same order and face the same direction as when they are placed in the card hopper.

The pivotal guide plate 203 is secured at one end to a shaft **205*a* rotatably supporting the returning roller 205 and pivotally supported at the other end at 206. Thus, the pivotal guide plate 203 can pivot together with the returning roller 205, about its pivot. By this arrangement, it is possible to move the pivotal guide plate 203 clockwise as indicated by a dash-and-dot line when the card 1 is jammed between the pivotal and fixed guide plates 203 and 202, so that access can be had to the card 1** to remove it manually.

Figure 23:
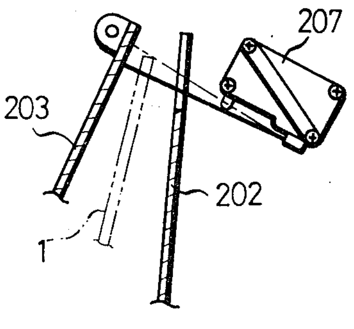
FIG. 23 is an enlarged view showing a portion of the modified card ejection device.

In the aforesaid alterative device, a plate spring is used as the card returning member 204. It is to be understood that a microswitch 207 may be arranged adjacent the fixed guide plate 202 as shown in FIG. 23 so as to use the actuator of the microswitch 207 as the card returning member. The microswitch 207 can also serve as a switch for the solenoid for moving the feed roller 201. That is, the microswitch 207 can be turned on when the actuator has moved to a dash-and-dot line position shown in FIG. 23 as is the case with the plate spring, whereby the feed roller 201 can be moved away from the drive roller 200. Thus, the microswitch 207 can perform the dual function of returning the card as a card returning member and of moving the feed roller 201 away from the drive roller 200.

If the alternative device shown in FIG. 21 to FIG. 23 is used, then the card stacker 25 can be arranged in the front portion of the enlarger-printer or nearer to the operator than the card stacker 25 of the previously described device. This facilitates removal of the aperture card that has been ejected from the machine. Moreover, the absence of rollers in the alternative device eliminates the possibility of the belts coming off their positions. Any card which becomes stuck in the card ejection passage can be readily withdrawn by hand.

The cards ejected onto the card stacker can be automatically arranged in the same order and direction as they are initially placed in the card hopper.

From the foregoing description, it will be appreciated that, in the enlarger-printer in accordance with the invention, it is possible to effect scanning of the aperture card in the direction in which the minor sides of the card are oriented by using devices of simple construction. This makes it possible to reduce the transverse dimention of the enlarger-printer. Moreover, the card stacker for storing the ejected aperture cards in vertically stacked relationship can be arranged at a level higher than that of the optical axis of the optical system, and this enables the operator to readily retrieve the used cards. Thus, the operation of the enlarger-printer can be facilitated. The fact that the reflectors and the photosensitive drum are arranged parallel to the direction A in which the aperture card is fed (See FIG. 1) makes it possible to simplify the construction of the optical system. The advantageous effect obtained by various features of the present invention are as described in the explanation of the embodiments of the invention.

While the form of apparatus herein described constitutes a preferred embodiment of the invention, it is to be understood that the invention is not limited to this precise form of apparatus, and that changes may be made therein without departing from the scope of the invention which is defined in the appended claims.

It is to be understood that, by combining the aforesaid devices for enlarging and printing the image of a microfilm with a known reader, it is possible to provide a reader-printer.

What we claim is:

1. An enlarger-printer comprising, in combination, means operable to feed a card, standing on one of its major sides, in the direction in which the major sides of said card are oriented, said card mounting therein a film; a scanning device operable to effect scanning of said film in the direction in which the minor sides of said card are oriented, said scanning device comprising a scanner for carrying the card and scanner moving means operable to move said scanner in the direction in which the minor sides of the card are oriented; means operable to position the card in the scanning device after the card has been fed in the direction in which the major sides of the card are aligned; a film margin differences compensating device operable to move the card in the scanning direction for compensating for differences in the margins of films; a photosensitive member of a copying apparatus; an optical system operable to irradiate the film to form an enlarged image of the film on said photosensitive member; and a card ejection device operable to eject the card after the card has been scanned.

2. An enlarger-printer as claimed in claim 1, including a drive motor for driving said card ejection device; and a one-way clutch connecting said scanner moving means to said drive motor; said one-way clutch effecting control of the rate of downward movement of said scanner by said drive motor.

3. An enlarger-printer as claimed in claim 1, further comprising a presser plate means attached to said scanner and comprising a fixed plate and a pivotal plate, said presser plate means being made of a material which transmits light rays.

4. An enlarger-printer as claimed in claim 1, further comprising a machine frame; a guide means pivotally connected to said scanner and operable to guide the card when the card moves into the scanning position; a spring biasing said guide means to a position in which said guide means can guide the card when the card moves into the scanning position; a projection on said guide means; and a pin fixed to said machine frame; said fixed pin being engageable by said projection to pivot said guide means against the bias of said spring, immediately before scanning is completed after said scanner has moved upwardly to perform a scanning operation, whereby said guide means is automatically released from its card guiding position.

5. An enlarger-printer as claimed in claim 1, in which said optical system comprises a light source and at least one reflector for reflecting light emanating from said light source onto the surface of said photosensitive member; a guide plate; a plurality of adjusting screws and a plurality of spring-biased pins maintaining said reflector in place on said guide plate; and respective knobs maintaining the springs of said spring-biased pins in position; said reflector being withdrawable from said guide plate lengthwise of the latter by removing said knobs and the associated springs.

6. An enlarger-printer as claimed in claim 1, wherein said scanner moving device comprises at least one ribbon connected at one end thereof to said scanner; a ribbon pulley to which said ribbon is connected at the other end thereof and on which said ribbon is wound; and drive means operable to rotate said ribbon pulley; said scanner being moved upwardly by the rotation of said ribbon pulley.

7. An enlarger-printer as claimed in claim 1, in which said film margin differences compensating device comprises a cam having a plurality of lobes of different heights on its periphery and corresponding in number to the number of different sizes of images of the microfilm mounted on the cards; a shaft; means securing said cam to said shaft to rotate therewith; drive means operable to rotate said shaft and said cam; a movable cam follower engaged with said cam for movement responsive to rotation of said cam; means connecting said cam follower to said scanning device for transmitting movement of said cam follower to a card positioned in said scanning device; and means operable to arrest said cam at a position in which said cam follower engages that one of said lobes corresponding to the film margin of the card then disposed in said scanning device.

8. An enlarger-printer as claimed in claim 7, in which said means for arresting said cam comprises a switch cam secured to the shaft to which said first-mentioned cam is secured; a plurality of switches at least equal in number to said plurality of lobes on the periphery of said first-mentioned cam; and means operable to arrest said shaft from rotation when one of said switches is actuated by said switch cam.

9. An enlarger-printer as claimed in claim 1, in which said card ejection device comprises a plurality of guide rollers; at least one ejection belt trained over said guide rollers; a drive roller operable to drive each ejection belt; a further roller positioned against one of said guide rollers; means pivotally mounting said further roller; resilient means operable to bias said further roller to pivot out of contact with said one guide roller; and drive means operable, responsive to a card moving through said scanning device being delivered from said scanning device to said card ejection device, to urge said pivotally mounted further roller to move into contact with said one guide roller against the bias of said resilient means.

10. An enlarger-printer as claimed in claim 1, in which said optical system comprises a plurality of projection lenses for enlarging and projecting the image of the microfilm mounted on the cards; said projection lenses having different respective magnifications; a turret mounting said projection lenses; plural movable slit plates; a fixed light intercepting plate; said movable slit plates being selectively movable into operative relation with said fixed light intercepting plate to provide respective exposing slits; a rotatable shaft carrying said movable slit plates; means rotatably mounting said turret; transmission means drivingly connecting said turret to said slit plate supporting shaft; and actuating means operable to actuate said transmission means to switch between said plurality of projection lenses and simultaneously to bring a corresponding movable slit plate into operative relation with said fixed light intercepting plate whereby projection lens selection and corresponding exposing slits of different sizes can be made effective simultaneously.

11. An enlarger-printer as claimed in claim 6, in which said drive means for rotating said ribbon pulley comprises a rotatable drive shaft; plural drive pulleys connected to said rotatable drive shaft for rotation therewith; respective driven pulleys rotated by said drive pulleys, said driven pulleys having respective different diameters; and respective clutches selectively operable to connect a selected driven pulley to said ribbon pulley; whereby scanning of the microfilm can be effected at respective different speeds in accordance with the particular magnification at which the microfilm is enlarged when projected.

12. An enlarger-printer as claimed in claim 10, including drive means operable to rotate said ribbon pulley; and plural clutches interposed between said ribbon pulley and said drive means; said transmission means effecting switching between said plural clutches, whereby scanning of the microfilm can be effected at a speed corresponding to the selected magnification at which the microfilm is enlarged.

13. An enlarger-printer as claimed in claim 1, in which said card ejection device comprises a drive roller having a high coefficient of friction; a feed roller movable into and out of engagement with said drive roller; said drive roller and said feed roller cooperating to remove a card from the scanning position, by engagement of said feed roller and said drive roller opposite surfaces of the card; a guide plate engageable with the card removed from the scanning position by said drive roller and said feed roller, and inclined relative to the direction of movement of the card; card returning means disposed above said guide plate for engagement by the card; a card stacker; and a return roller cooperable with said drive roller to eject the card into the card stacker following change of the direction of movement of said card by said card returning means in cooperation with said drive roller.

14. An enlarger-printer as claimed in claim 13, wherein said drive roller is formed with a serration on its outer periphery.

15. An enlarger-printer as claimed in claim 13, including means pivotally supporting said guide plate.

* * * * *